(12) United States Patent
Cardno et al.

(10) Patent No.: US 10,482,636 B2
(45) Date of Patent: *Nov. 19, 2019

(54) DATA VISUALIZATION METHODS

(71) Applicant: New BIS Safe Luxco S.à.r.l., Luxembourg (LU)

(72) Inventors: Andrew John Cardno, San Diego, CA (US); Peter Stewart Ingham, Lower Hutt (NZ); Bart Andrew Lewin, Woodland Hills, CA (US); Ashok Kumar Singh, Henderson, NV (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,184

(22) Filed: Jun. 28, 2017

(65) Prior Publication Data

US 2017/0365080 A1 Dec. 21, 2017

Related U.S. Application Data

(63) Continuation of application No. 14/253,472, filed on Apr. 15, 2014, now Pat. No. 9,761,025, which is a continuation of application No. 13/129,244, filed as application No. PCT/NZ2009/000247 on Nov. 13, 2009, now Pat. No. 8,717,364.

(60) Provisional application No. 61/115,038, filed on Nov. 15, 2008.

(51) Int. Cl.
*G06T 11/20* (2006.01)
*G06F 16/34* (2019.01)

(52) U.S. Cl.
CPC ............ *G06T 11/206* (2013.01); *G06F 16/34* (2019.01)

(58) Field of Classification Search
None
See application file for complete search history.

(56) References Cited

U.S. PATENT DOCUMENTS

| 7,389,210 | B2 | 6/2008 | Kagarlis |
| 7,413,546 | B2 | 8/2008 | Agutter et al. |
| 7,480,866 | B2 | 1/2009 | Germain et al. |
| 2002/0165810 | A1 | 11/2002 | Evertsz et al. |
| 2005/0066277 | A1 | 3/2005 | Leah et al. |
| 2005/0192825 | A1 | 9/2005 | Cardno et al. |
| 2005/0261886 | A1 | 11/2005 | Kagarlis |

(Continued)

FOREIGN PATENT DOCUMENTS

WO WO 2009/154483 12/2009

OTHER PUBLICATIONS

International Search Report for International Application No. PCT/NZ2009/000247 dated Mar. 8, 2010 (Form PCT/ISA/210).

(Continued)

*Primary Examiner* — Yi Wang
(74) *Attorney, Agent, or Firm* — Merchant & Gould P.C.

(57) ABSTRACT

A method of creating a graphical representation of data points in the form of a heatmap wherein the heatmap represents a plurality of multi-directional flow values between the data points, the method including the steps of: positioning data points on a heatmap for graphical representation, calculating bi-directional flow values between at least a first and second data point, determining the intensity and direction of a predominant flow from the bi-directional flow values, and graphically representing the predominant flow and bi-directional flows between the data points in the heatmap.

20 Claims, 18 Drawing Sheets

(56) References Cited

U.S. PATENT DOCUMENTS

2006/0036425 A1    2/2006   Le Cocq et al.
2006/0253246 A1   11/2006   Cera et al.
2008/0091757 A1    4/2008   Ingrassia et al.
2009/0315888 A1   12/2009   Brabec
2009/0323029 A1   12/2009   Chen et al.

OTHER PUBLICATIONS

Joseph K. Berry, "Nearby Things are more Alike." Geo World, Feb. 2006, pp. 16-17, http://www.innovativegis.com/basis/MapAnalysis/Topic26/Topic26/htm.

DATA VISUALIZATION METHODS

This application is a Continuation of U.S. patent application Ser. No. 14/253,472, filed 15 Apr. 2015, which is a Continuation of U.S. patent application Ser. No. 13/129,244, filed 5 Dec. 2011, which is a National Stage Application of PCT/NZ2009/000247, filed 13 Nov. 2009, which claims benefit of U.S. Provisional Ser. No. 61/115,038, filed 15 Nov. 2008 and which applications are incorporated herein by reference. To the extent appropriate, a claim of priority is made to each of the above disclosed applications.

FIELD OF THE INVENTION

The present invention relates to improved data visualization methods. In particular, the present invention relates to various methods of creating graphical representations of data in the form of heatmaps.

BACKGROUND

A chart or graph is described in Wikipedia as a type of information graphic or graphic organizer that represents tabular numeric data and/or functions. Charts are often used in an attempt to make it easier to understand large quantities of data and the relationship between different parts of the data. Charts can usually be read more quickly than the raw data that they come from. They are used in a wide variety of fields, and can be created by hand (often on graph paper) or by general purpose computers or specific computers using various different charting applications.

Traditional charts use well established and often poorly implemented ways of representing data. Many tools exist to help the user construct very sophisticated representations of data but that sophistication typically results in less meaningful charts.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that are most required and relevant to an end user.

One known method of visualizing data is the heatmap. A heatmap identifies the values of individual and specific data points by allocating a specific color based on the data point value. For example, red may indicate that the data point value is high, and blue may indicate that the data point value is low. The color spectrum in between red and blue may then be used to indicate the interim values of other data points. If heat values in between data points are to be indicated, interpolation values need to be calculated to determine the heat values.

The heatmap graphic is particularly useful for showing the position and intensity of certain data values with respect to other data values and within a defined environment, such as a geographical area, temporal period or other environment. However, previous known methods of representing data using heatmaps merely indicate the values of the individual data points and don't identify any relative correlation between the data points other than their relative values. In particular, they do not provide any directional or flow correlation between data points.

It is known to create heatmaps using an inverse distance weighted (IDW) formula, such as a bell shaped curve. However, these methods are extremely complex and can cause artefacts, and so can be particularly problematic. It is also known to use a cubic spline method to create a heatmap, however this method is particularly CPU intensive.

The heatmaps produced by the above described methods can produce quite garish and intense maps that tend to confuse the eye of the reader due its non-organic structure.

FIG. 1, for example, is produced by rendering circles around a specific data point, where the color and diameter of the circle is based on a variable associated with the data point. That variable is only associated with the particular data point being represented. Color values in between two data points are interpolated based on the data point values of the two data points. The heatmap produced does not show any interrelationship between two data points, but merely shows each data point's value.

It is also known to produce what are termed "flow maps" which provide a user with an indication of flow from one point to another. However, these flow maps merely show flow from one point to another point in a single direction. Further, these types of flow maps do not provide an indication of how data points and the flow values affect surrounding areas depicted on the graphic representation.

The present invention aims to overcome, or at least alleviate, some or all of the mentioned problems, or to at least provide the public with a useful choice.

SUMMARY OF THE INVENTION

The present invention provides a system and method that provide an improved data visualization method.

According to one aspect, the present invention provides a method of creating a graphical representation of data points in the form of a heatmap wherein the heatmap represents a plurality of multi-directional flow values between the data points, the method including the steps of: positioning data points on a heatmap for graphical representation, calculating bi-directional flow values between at least a first and second data point, determining the intensity and direction of a predominant flow from the bi-directional flow values, and graphically representing the predominant flow and bi-directional flows between the data points in the heatmap.

According to a further aspect, the present invention provides a graphical computing system for creating a graphical representation of data points in the form of a heatmap wherein the heatmap represents a plurality of multi-directional flow values between the data points, the system including: a node determination module arranged to position data points on a heatmap for graphical representation, a flow determination module arranged to calculate bi-directional flow values between at least a first and second data point, a heat determination module arranged to determine the intensity and direction of a predominant flow from the bi-directional flow values, and a rendering module arranged to graphically representing the predominant flow and bi-directional flows between the data points in the heatmap.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
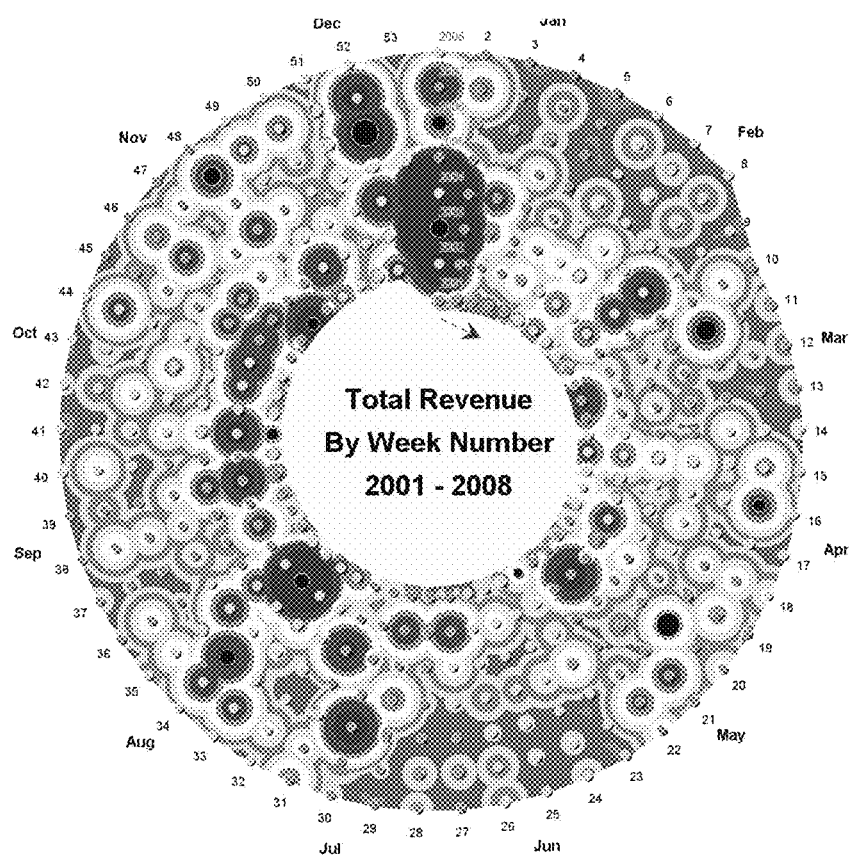
FIG. 1 shows an example of a heatmap using a prior known method.

The following described invention is suitable for use in conjunction with other methods, and the incorporation into one or more systems, described in an earlier filed US provisional patent application by the applicant. Namely, U.S. provisional patent application 61/074,347 filed on 20 Jun. 2008, and entitled METHODS, APPARATUS AND SYSTEMS FOR DATA VISUALISATION AND RELATED APPLICATIONS, which is hereby incorporated by reference.

Embodiments of the present invention are described herein with reference to a system adapted or arranged to perform various methods of creating graphical heatmap representations.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

Figure 2A:
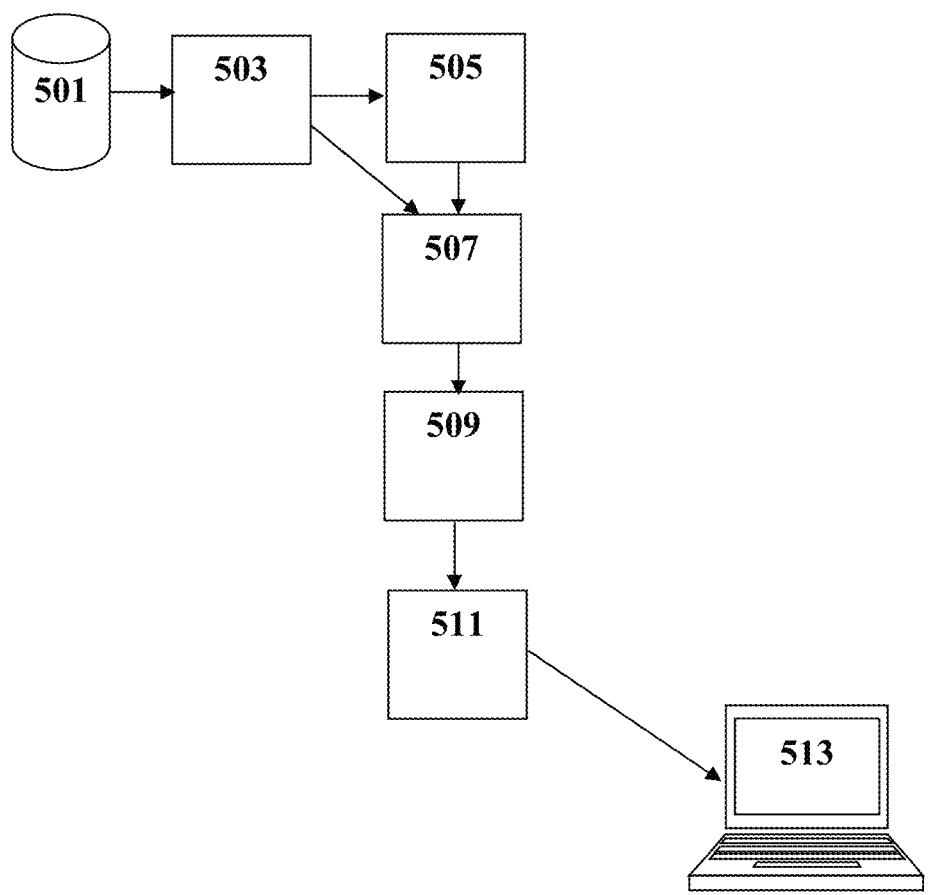
FIG. 2A shows a system block diagram of a data visualization system according to an embodiment of the present invention.

FIG. 2A shows a system block diagram of a data visualization system specifically adapted to perform at least some of the various methods as herein described in this embodiment.

A data storage module 501 sends data to a data retrieval module 503 upon request from the data retrieval module. It will be understood that as an alternative the data retrieval module may automatically receive the data without making specific requests.

That is, the data retrieval module is configured to enable the retrieval of data from a data storage module, which is in communication with the data visualization system. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

A node determination module 505 uses the data retrieved by the data retrieval module to place or position a specific number of nodes required for the graphical representation at specific points on the heatmap based on the data being represented. That is, each node is a visual representation of a data point used to represent the retrieved data. The node is used to represent a data value associated with retrieved data for a specific point. For example, each node may represent a data value for different points, such as spatial, temporal and geographical points etc.

The nodes may represent a layout of a web page as described in the following example, or may represent other spatial or geographical data. For example, the nodes may represent: cities or towns; shopping centers or malls; retail outlets; factory facilities; manufacturing facilities; the position of elements within a manufacturing environment; entities such as people, customers, suppliers, workers etc; the location of various suppliers in a supply chain; the position and layout of various elements in a gaming environment.

Further, the nodes may represent temporal data. For example, the nodes may represent points in time, such as seconds, minutes, hours, days, weeks, months, years, or parts thereof.

In the example described below, the nodes are used to represent each web page available on a web site. The positioning (both relative and absolute) of the nodes in the described example shows the hierarchy and interconnection of the web pages based on the accessibility of each web page.

A flow determination module 507 receives the data from the data retrieval module and node data from the node determination module. The flow determination module is used to determine the flow of traffic passing from and to each of the nodes created in the node determination module, as will be described in more detail below.

A heat determination module 509 receives the data from the flow determination module and is used to determine heat values around the node points and the various flows determined between the nodes as well as determining the amount of traffic entering at a particular node, as will be described in more detail below.

The flow determination module and heat determination module are used to calculate entry values at each node. That is, the flow starting value for that node indicating the starting number of entrants at the node (e.g. the number of people who entered the website at that node). Further, the modules calculate the flow values between nodes, predominant flow values and then calculate the heatmap based on a combination of the flow and entry values.

A rendering module 511 is used to render a suitable image for output to an output module. The output module may be a display device, such as a standalone display unit, or a display unit integrated with a laptop computing device, PC, hand held computing device, or other computing system or display system.

As an alternative to, or in conjunction with, the display module, further output modules may be provided to output the rendered image. That is, the raw data retrieved by the data retrieval module is analyzed and converted to provide output data in a specific format. The output data is provided to the display and/or further output modules to enable a user to visualize the raw data in a manner that conveys clear and concise information that is easy to be interpreted and understood.

The further output module may be a printing device in communication with the described system to receive print control data so that representations of the data may be printed on any suitable print medium. Alternatively, the further output module may be an interface that enables the data output from the alignment module to be interfaced with other data handling modules or storage devices. As a further alternative, the output module may be the same or different data storage module as described above.

Figure 2B:
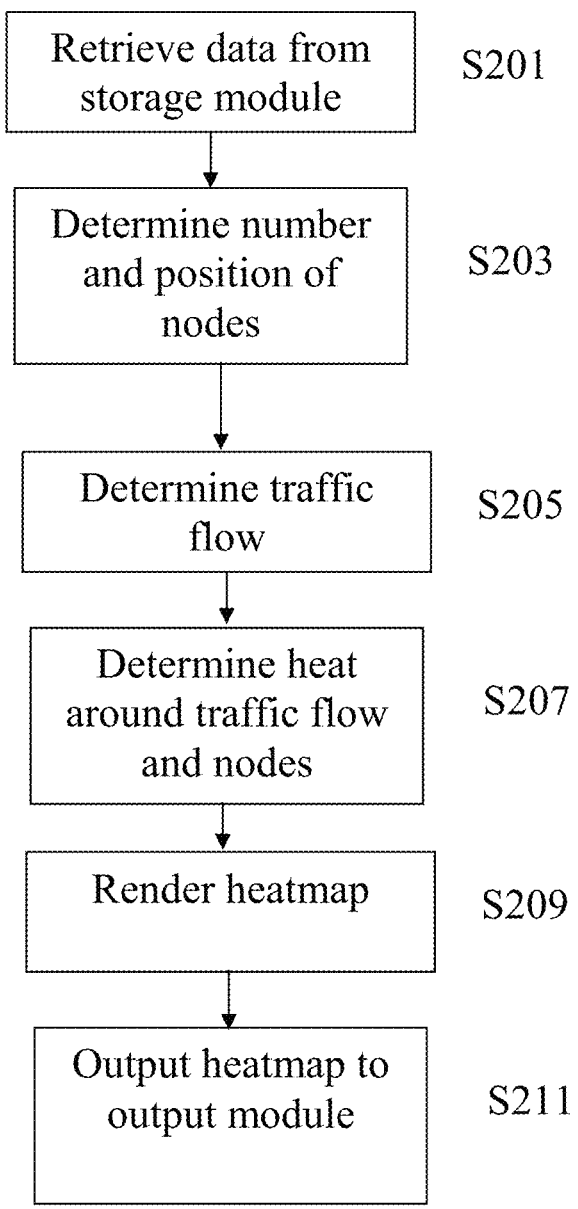
FIG. 2B shows a flow diagram for performing a heatmap generation method according to an embodiment of the present invention.

FIG. 2B shows a flow diagram for producing a heatmap according to this embodiment.

At step S201, data is retrieved from the storage module by the data retrieval modules.

At step S203, the node determination module determines how many nodes are to be represented and the position of those nodes in the heatmap. This information may be stored separately within the retrieved data, determined from the retrieved data or provided separately to the system by the user either prior to, during or subsequent to retrieving the data. The number and position of the nodes will be dependent on the type of data being represented and the requirements of the user. For example, in the embodiment herein described, the nodes indicate separate web pages in a web site. The number of nodes matches the number of separate web pages available on a web site. The nodes are positioned in a hierarchical manner based on the structure of the web site, with the home page being the top level node shown in the centre and bottom of the heatmap. Subsequent lower level nodes are then represented radially outwards from the top level node, with the lowest level nodes being represented on the outer portions of the heatmap.

As an alternative, the nodes may represent, for example, areas in a manufacturing environment, retail areas or points in a retail environment or gaming elements in a gaming environment.

Figure 4:
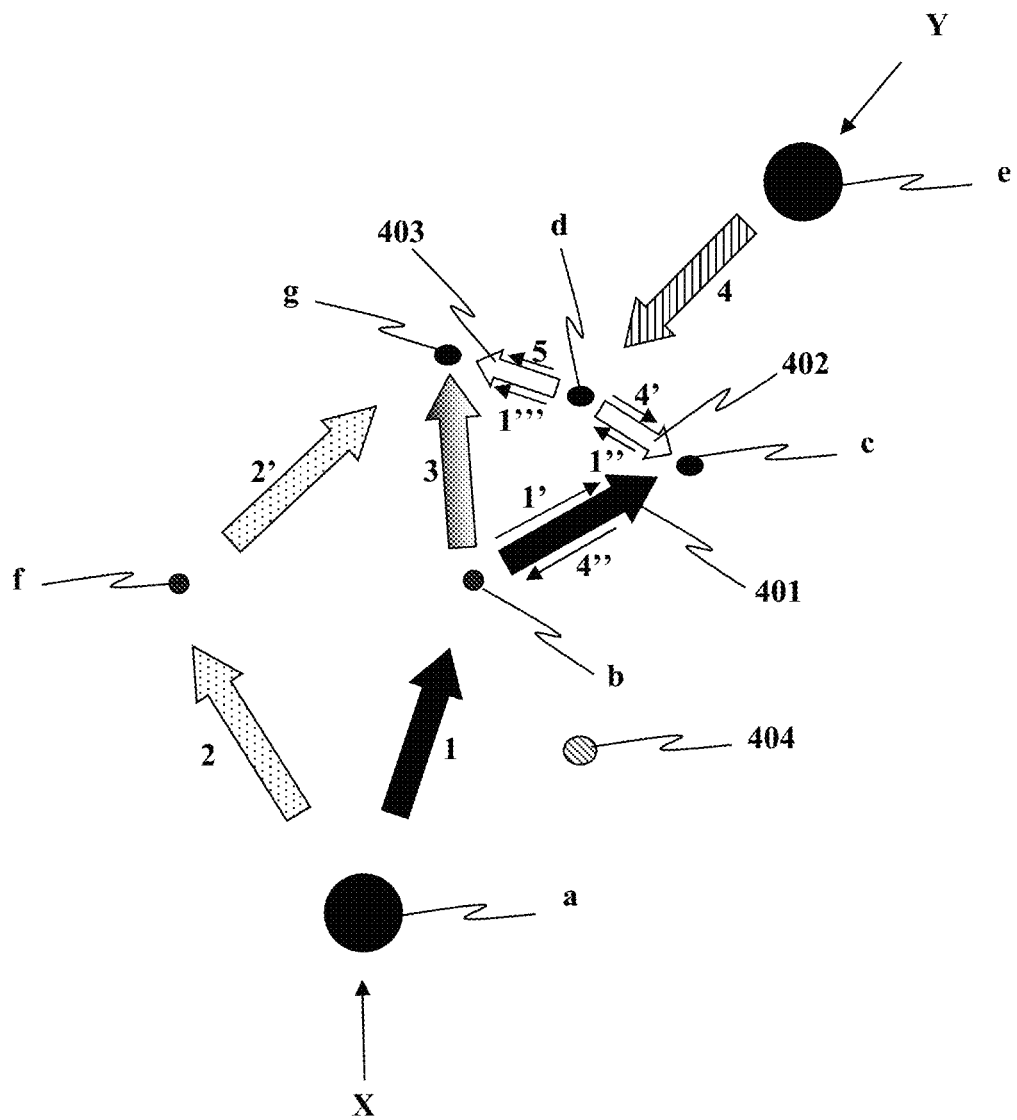
FIG. 4 shows a conceptual diagram indicating the flow of traffic on a heatmap created according to an embodiment of the present invention.

At step S205 flow values are calculated using the flow determination module. According to this embodiment, the flow calculated is that of the flow of traffic visiting the website. Referring to FIG. 4, an example of how the flow values are calculated is provided. Nodes "a" and "e" indicate two main entry points into the website with "X" indicating the number of people entering the website at node "a", and "Y" indicating the number of people entering the website at node "e". Looking at the flow of traffic of people "X", certain people will only enter the website at node "a" and then leave again. Others will proceed to other web pages as indicated by nodes "b" and "f".

A first flow, Flow 1, is thus indicated for people that enter at "a" and move to node "b". Flow 1 then continues as Flow 1' from node "b" to node "c". Flow 1' then continues as Flow 1" from node "c" to node "d". Flow 1" then continues as Flow 1'" from node "d" to node "g", where it terminates.

Flow 2 indicates the flow between node "a" and node "f". This is the number of people "X" who are not part of Flow 1, and who did not stay at node "a" ("aS"). From node "f" Flow 2' is indicated to node "g", where this flow terminates.

Flow 3 indicates the flow between node "b" and node "g". This is the number of people from Flow 1 who do not stay at node "b" ("bS") and do not form Flow 1'.

Looking at the flow of traffic of people "Y", certain people will only enter the website at node "e" and then leave again. Others will proceed to the web page indicated as node "d".

Flow 4 indicates the traffic flow that enters at node "e" and moves to node "d". Flow 4 then continues as Flow 4' from node "d" to node "c". From node "c" to node "b" Flow 4" is indicated.

Flow 5 indicates the traffic flow between node "d" and node "g". This is the number of people from Flow 4 who do not stay at node "d" ("dS") and do not form Flow 4'.

Therefore, the flow values between nodes are calculated using the following algorithms:

$$\text{Flow 1} = X - aS - \text{Flow 2}$$

$$\text{Flow 1'} = \text{Flow 1} - bS - \text{Flow 3}$$

$$\text{Flow 1''} = \text{Flow 1'} - cS$$

$$\text{Flow 1'''} = \text{Flow 1''} - dS(\text{of Flow 1''})$$

$$\text{Flow 2} = X - aS - \text{Flow 1}$$

$$\text{Flow 2'} = \text{Flow 2} - fS$$

$$\text{Flow 3} = \text{Flow 1} - bS - \text{Flow 1'}$$

$$\text{Flow 4} = Y - eS$$

$$\text{Flow 4'} = \text{Flow 4} - dS(\text{of Flow 4}) - \text{Flow 5}$$

$$\text{Flow 4''} = \text{Flow 4'} - cS(\text{of Flow 4'})$$

$$\text{Flow 5} = \text{Flow 4} - dS(\text{of Flow 4}) - \text{Flow 4'}$$

Where aS=number of people who enter node "a" and then depart the website without moving to another node (i.e. non-moving or stationary traffic), and where bS, cS, dS, eS & fS apply to nodes b, c, d, e & f respectively.

It will be understood that these flow values may be calculated in other ways such as by measuring the traffic in real time or from recorded data and tracking the previous positions of the traffic to identify the direction of the flow.

It will be understood that any other suitable methods may also be used to calculate the flow values between nodes and that the invention is not limited to specific methods of calculating flow.

Arrow 401 in FIG. 4 indicates the overall (or cumulative) flow between nodes "b" and "c". That is, the flow 1' (towards node "c") is greater than the flow 4" (towards node "b") and so the predominant flow is in the direction of the arrow 401 from node "b" towards node "c".

Arrow 402 in FIG. 4 indicates the overall (or cumulative) flow between nodes "d" and "c". That is, the flow 4' (towards node "c") is greater than the flow 1" (towards node "d") and so the predominant flow is in the direction of the arrow 402 from node "d" towards node "c".

Arrow 403 in FIG. 4 indicates the overall (or cumulative) flow between nodes "d" and "g". That is, the flows 5 and 1'" from node "d" to node "c" are combined. Therefore the cumulative flow is in the direction of the arrow 403 towards node "g".

Therefore, predominant flow values are calculated based on flow in multiple directions. Although this embodiment specifically gives example of uni-directional flow (such as Flow 1) and bi-directional flow (such as the flow depicted by arrows 401, 402 and 403), it will be understood that predominant flow values may be calculated from any number of calculated flow values between two nodes, where the predominant flow value and direction is calculated to be the overall effect of the individual flow values and directions, for example by calculating the cumulative effect of all flow values in between the nodes.

At step S207, the heat values for the heatmap are calculated by the heat determination module.

Referring to FIG. 4, a heat point 404 is indicated on the heatmap to provide an example of how the heat values are calculated for specific points on the heatmap representation. The heat determination module calculates interpolation values between data points, such as the value that heat point 404 is to be represented.

The heat determination module uses the predominant flow values previously calculated and applies weighting values to these flow values based on the distance the flow values are from the point being calculated. The weighting values are chosen or modified to include flow values that are considered relevant to the heat point being represented. For example, the weighting values may be adjusted by the user to include or exclude flow values that are at or beyond a particular distance from the heat point being calculated. If large weighting factors were applied to all flow values then the heatmap representation would result in a large single area being represented without providing any detailed directional flow for specific points in the heatmap. Conversely, if low weighting factors were applied to the flow values then the heatmap would not provide any discernible flow details at all. Therefore, a predetermined value for the data being represented may be applied to the weighting values, or the user may select a suitable weighting factor based on how much flow in an area around each heat point is to be taken into account when calculating the heat value.

Referring to FIG. 4, the calculation of the heat for heat point 404 is made using weighting values of various magnitude applied to the traffic measured at node "a", the traffic measured at node "b", the flow measured for Flow 1 and the flow measured for Flow 1'. Further, the user may desire to include further flow measurements to give a more general heat indication of the flow by expanding the weighting values to include further flow values, such as Flow 3 and traffic at node "c". It may be undesirable to the user to expand the weighting values to significantly include the values of node "f" otherwise the split of flow from node "a" in the form of Flow 1 and Flow 2 may not be clearly represented. However, the value of Flow 2 may still be included in the heat calculation by a small weighting factor.

Other heat points in the heatmap as well as the heat points associated with specific data points will be calculated in the same manner. For example, a heat point around the data point representing node "b" will be calculated using weighted values of Flow 1, Flow 1', Flow 3, number of people who entered the website at node "b" (if any) and Flow 2' (if the sensitivity of the system is adapted by the user to include this flow value).

In general, heat points on the heatmap=SumALL (ValueFunction*WeightedDistanceFunction);

WeightedDistancefunction is a weight value where the sum of all weights for each heat point=1.

Example: ValueFunction=value at a source point.

Example: DistanceFunction=Distance*Distance. That is, fall off values are calculated based on the distance so that flow values further away count less than flow values nearby. It will be understood that other distance functions may be used such as distance function=distance. Therefore a weighting factor for flow values as they become nearer the measured heat point approach 1, and weight factors for flow values as they become further away approach zero.

Using a simple numeric example, a line generates a continuous $$WeightedDistanceFunction=(w-d)/w,$$

where
w=sum of all DistanceFunctions and d=DistanceFunction.

So if there are two points, point 1 and point 2, near to the heat point being calculated and the distance (d1) to point 1 from the heat point=2 and the distance (d2) to point 2 from the heat point=10, then:

$$w=(2*2)+(10*10)=104$$

$$WeightedDistanceFunction1 \text{ for point } 1=(104-2^2)/104=100/104$$

$$WeightedDistanceFunction2 \text{ for point } 2=(104-10^2)/104=4/104$$

$$\text{Sum of WeightedDistanceFunctions}=1 \text{ (i.e.} (4/104)+(100/104)=1)$$

Therefore flow values for the heat point being calculated are (100/104*ValueFunction1)+(4/104*ValueFunction2)

Where ValueFunction1=predominant heat value calculated at point 1, and ValueFunction2=predominant heat value calculated at point 2.

As a further example, an inverse distance weighting (IDW) method may be used as described at en.wikipedia.org/wiki/Inverse_distance_weighting.

At step S209 the heatmap is rendered using the heatmap values calculated by the heat determination module and the node points.

At step S211 the rendered heatmap is sent to the output module.

Figure 3A:
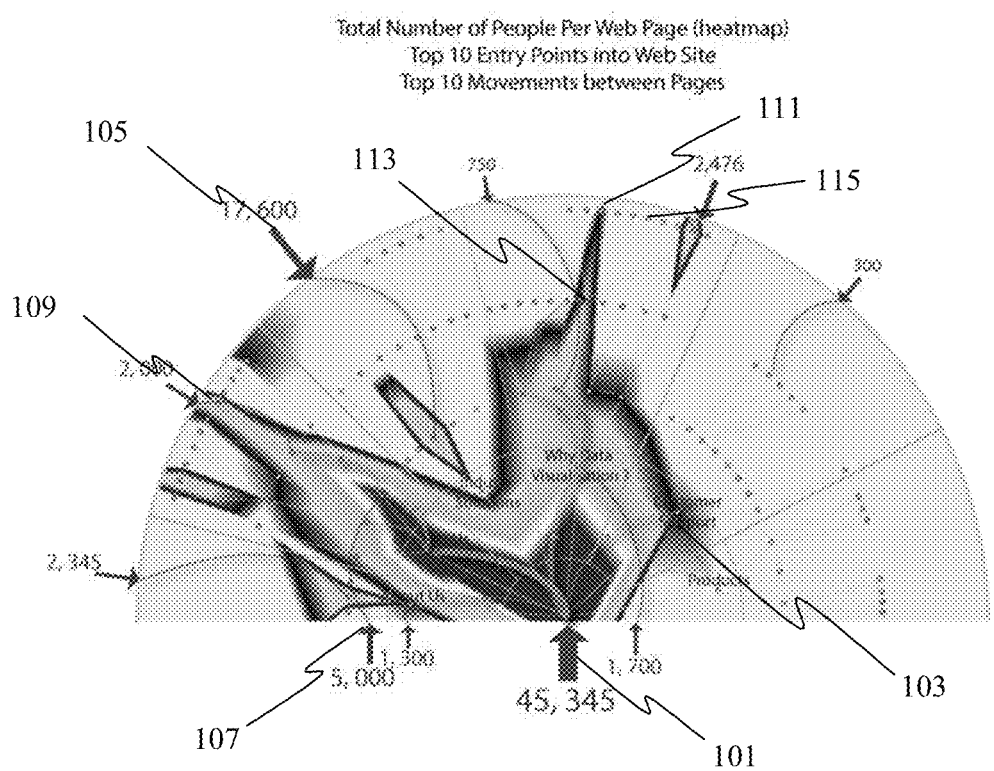
FIG. 3A shows a heatmap generated according to an embodiment of the present invention.
Figure 3B:
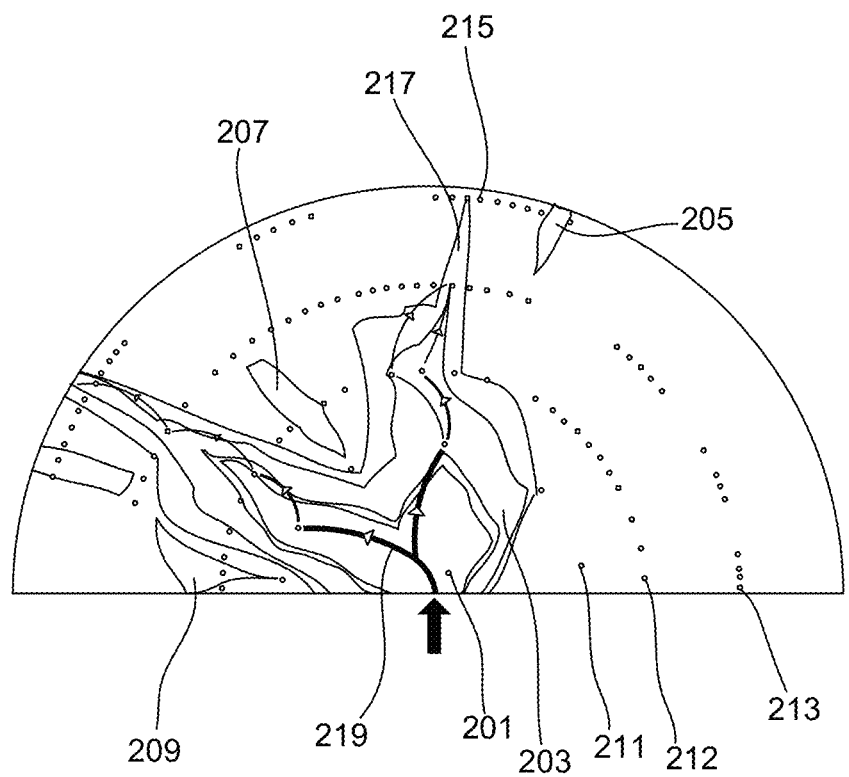
FIG. 3B shows a representation of a section of the heatmap of FIG. 3A in black and white.

According to one example for this embodiment of the present invention as shown in FIGS. 3A and 3B, web page hits are shown for a number of web pages on a web site. When users access a web site, they may do so from a number of different access points, usually starting with the home page. They then move, navigate or propagate through the website by clicking on various links displayed on a browser used to access the website. By adding up the total flow of users through a web site a very useful image can be created to indicate the directional web traffic flow and the most and least popular paths of flow. The described method provides a unique way of representing this propagation by way of a new heatmap diagram.

FIG. 3A shows the resultant heatmap, and FIG. 3B shows a further black and white representation of the heatmap.

FIG. 3A shows the home page 101 entry point for most users. The number of hits has been indicated as 45,345 for the home page. Only a certain number of pages are available for access from the home page, and these are shown on the next layer of web pages. One example is the Customer Support web page 103. Referring to FIG. 3B, the second layer of web pages 211 can be more clearly seen. Also included are a third layer 212, a fourth layer 213 and a fifth layer 215.

A number of other entry points onto the website are also shown as can be seen on FIG. 3A by the arrows pointing into the heatmap. For example entry point 105 where 17,600 people entered the website is indicated. This entry point may be due to users having bookmarked pages that enable them to enter the web page at that point, or due to search engines specifically linking users directly to that specific web page, rather than through to the home page. Other entry point examples are shown at point 107 and 109.

The predominant flow or propagation of traffic once users have entered the website can be more clearly seen with reference to FIGS. 3A and 3B. Area 201 is the hottest area and so is colored red. Area 203 is the next hottest area and is colored from green to blue emanating outwards from area 201. The area directly between areas 201 and 203 is colored through the range red to orange to yellow to green, to show the transition between the areas 201 and 203.

Other unlinked hot areas, such as 205, 207 and 209 are also indicated. In this example, the areas are colored green in the centre spreading to blue on the outer edge of the areas. These areas show the entry points into the website other than through the home page.

Referring to FIG. 3A, the predominant propagation of flow is indicated by point 111, and in FIG. 3B, by point 217. This is the point where the propagation of traffic has ended and so is indicated as a cooler color (such as blue, for example) fading to nothing (i.e. the background color of the heatmap).

The heatmap therefore provides a generalized representation of the data designed to enable the observer to see and interpret patterns. It is a not a representation of the actual flow but the amount of flow and direction of flow (from particular points) can be determined from measurement of the representation. Further, flow between points can be determined from the representation of the data.

Therefore, for each person moving through the website, the path of that person is tracked and recorded. The paths of all users are then calculated together to show the "heat" of the path and its predominant flow direction. This results in a graphical generalized representation of flow rather than individual points emanating heat as is usual in heatmaps.

Although a web site example has been given, it will be understood that this methodology may be applied to any other suitable technology where representation or recordal of data flow or data value flow is beneficial. For example, the system may be used to track component parts in a factory environment, or parcels/packages in a delivery system. Further, the system could be utilized to show the routing of data between various servers in a network to determine where the bottlenecks in the network may or do occur.

The flow method described herein is superior to classic heatmaps due to its efficient method of interpreting movement in more than one direction.

The values indicating the flow of traffic on the website are used to render the image by the rendering module. In order to produce the flow heatmap as described herein, the rendering module may use any known suitable rendering method. According to this embodiment, the rendering module renders the image using a triangulation interpolation network. That is, a vector surface is created from a set of points with heights representing the "heat" of that point. A wireframe diagram is created by joining all the adjacent points to create triangles.

The image is then rendered by the rendering module by constructing a surface model. The surface model is based on the addition of all the flow paths through the network. A heatmap is then built over the surface model.

The values for each point on the heatmap may be represented using colors or grey scales wherein the absolute value of each data point is represented using a range of colors or grey scales and the color chosen from the scale varies based on the absolute value.

In addition or alternative to representing the data points using color or grey scale, the absolute value for each data point may be represented using size, shape, location or orientation of an icon (such as dot density), wherein the size, shape, location or orientation of the icon varies based on the absolute value. For example, the icon may be a circle and the diameter of the circular icon may be based on the absolute value. Other suitable geometric shapes may also be used.

Heat values between data points are representative of the flow of traffic between and around the data points. That is, the representation of "heat" between each data point or node represents how much flow (if any) of traffic has occurred between the data points. For example, referring to FIG. 3A, heat is represented between data points 111 and 113 to indicate traffic flow between the two data points. Whereas between data points 111 and 115 no heat is represented and so this clearly indicates that there is no traffic flow between these two data points.

In the example where the heatmap is rendered by the rendering module using various colors, the graphical values of the data points are first calculated using the above described methodology to determine flow values at each data point. The color red is then allocated to display the data points with the highest flow values, and the lowest flow values are represented by the color violet. All interim values are given a color between red and violet on the light spectrum, i.e. from red through to orange, yellow, green, blue, indigo and then violet. Colors between data points are determined by using the weighted interpolation algorithm described above.

The propagation of values associated with a data point is described above in relation to the propagation between a parent and child node only. That is, the propagation is by way of a single step between two nodes. However, it will be understood that the propagation associated with nodes further down the line, i.e. two or more steps from the parent, may also be graphically represented. For example, where nodes (data points) are linked with other nodes that are two or more steps away along the propagation flow, the nodes may be moved closer together thus creating a more intense heat value between the nodes in order to indicate a stronger link between the two data points in the visualization.

There are certain key elements that a graphical visualization system designer should bear in mind when determining how and in what form a graphical image is to be visualized. For example, the graphical image should be visually pleasing to the eye of the user, understandable to the user such that it conveys relevant information about the data being represented and able to be efficiently produced by the system. The above described embodiments meet all of these requirements.

Second Embodiment

According to this embodiment, a further example is provided of a method for generating a graphical representation in the form of a heatmap in order to represent flow in more than one direction.

Figure 5A:
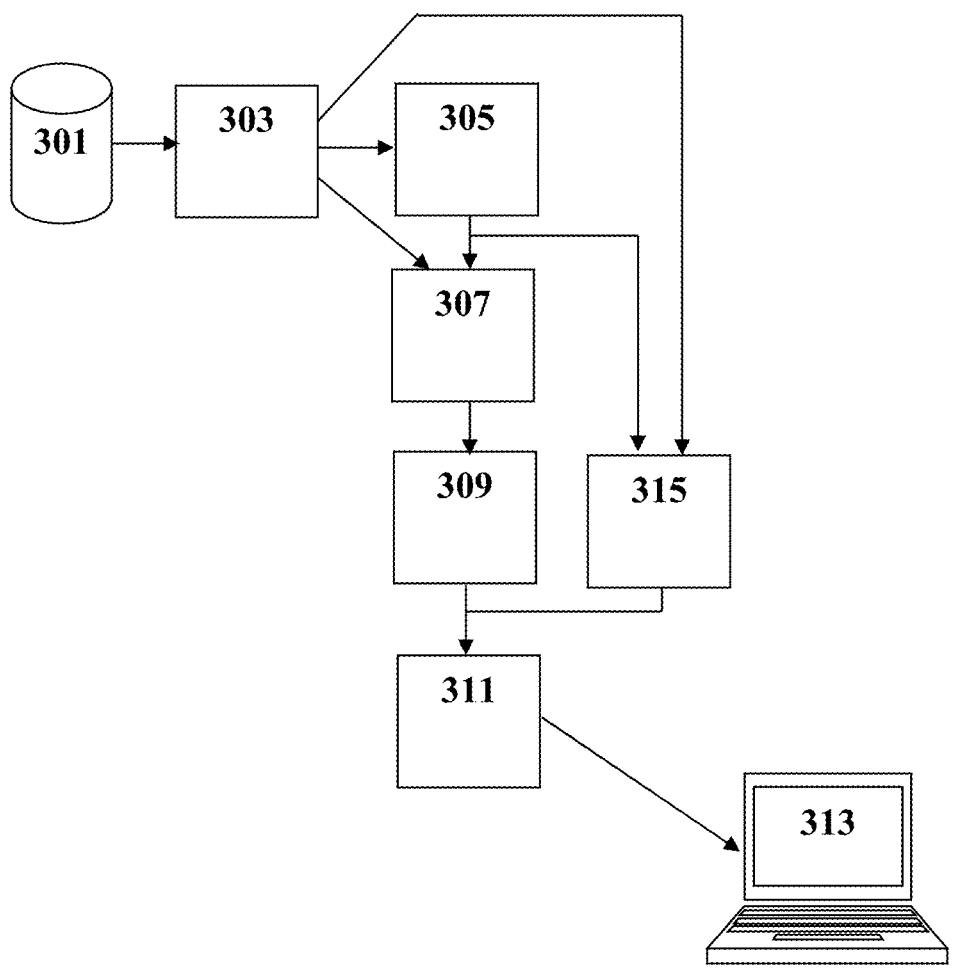
FIG. 5A shows a system block diagram of a data visualization system according to an embodiment of the present invention.

Referring to FIG. 5A, a system block diagram is shown of a data visualization system specifically adapted to perform at least some of the various methods as herein described in this embodiment.

As in the first embodiment with reference to FIG. 2A, a data storage module 301, data retrieval module 303, node determination module 305, flow determination module 307, rendering module 311 and output module 313 are used in the same manner as described therein.

An alternative heat determination module 309 is now herein described. The heat determination module of this embodiment receives the data from the flow determination module and is used to determine heat values around the node points based on the various flows determined between the nodes, as will be described in more detail below.

The system also includes a cone generation module 315 that is arranged to depict the number of entrants at a particular node using a conic generation method as described in more detail below.

The flow determination module and heat determination module are used to calculate flow values between nodes and from those flow values calculate predominant flow values. The heatmap created is based on the predominant flow values.

Figure 5B:
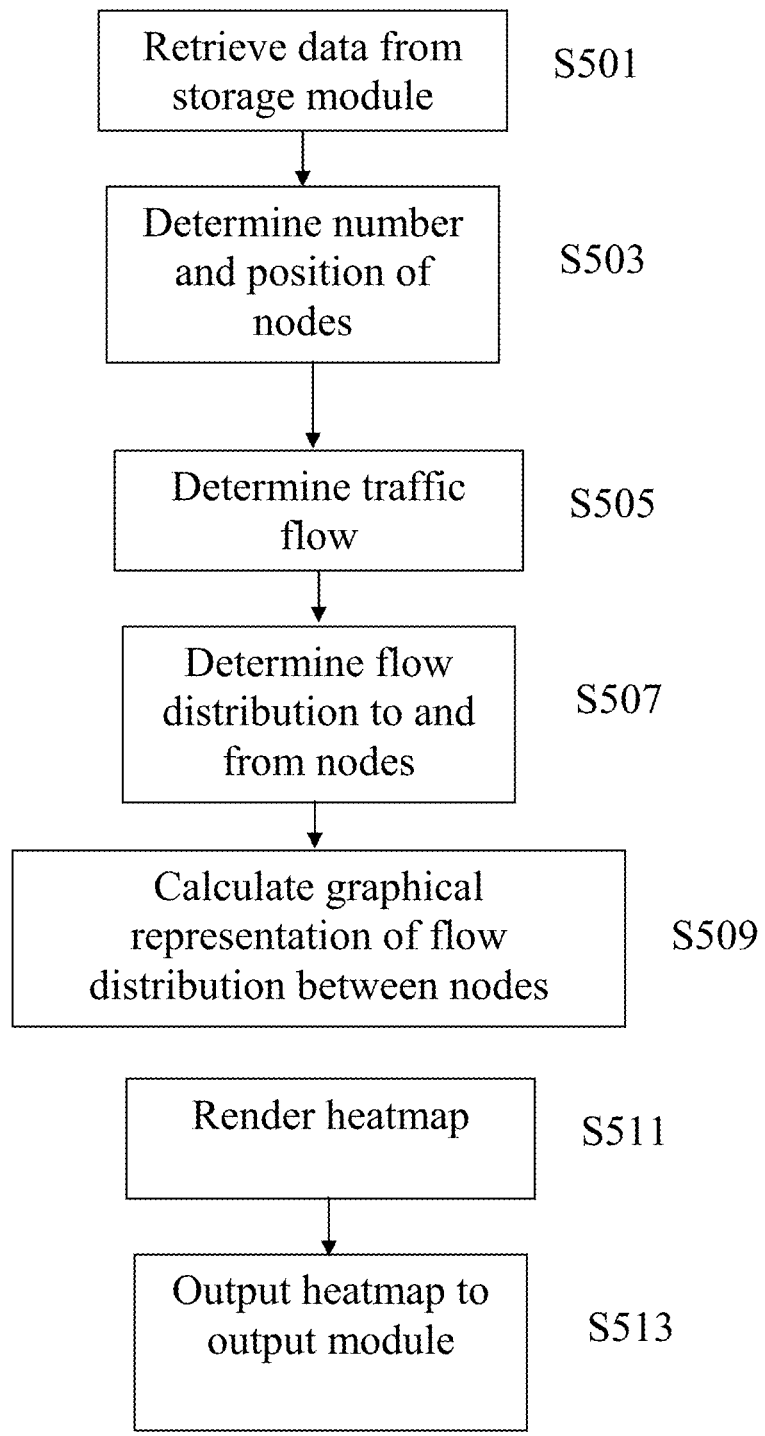
FIG. 5B shows a flow diagram for performing a heatmap generation method according to an embodiment of the present invention.

FIG. 5B shows a flow diagram for producing a heatmap according to this embodiment.

At step S501, data is retrieved from the storage module by the data retrieval modules, as in the first embodiment.

At step S503, the node determination module determines how many nodes are to be represented and the position of those nodes in the heatmap, as in the first embodiment.

At step S505 flow values are calculated using the flow determination module, as in the first embodiment.

At step S507, flow distribution values between modes are calculated. That is, the flow from each node to a connected node is calculated. This is the number of entities emanating from one node to another node as determined from the flow values calculated in step S505.

At step S509, a graphical representation of the flow distribution between nodes is calculated.

At step S511, the graphical representation created at step S509 is rendered.

At step S513, the rendered graphical representation is output to an output module, as in the first embodiment.

Figure 6A:
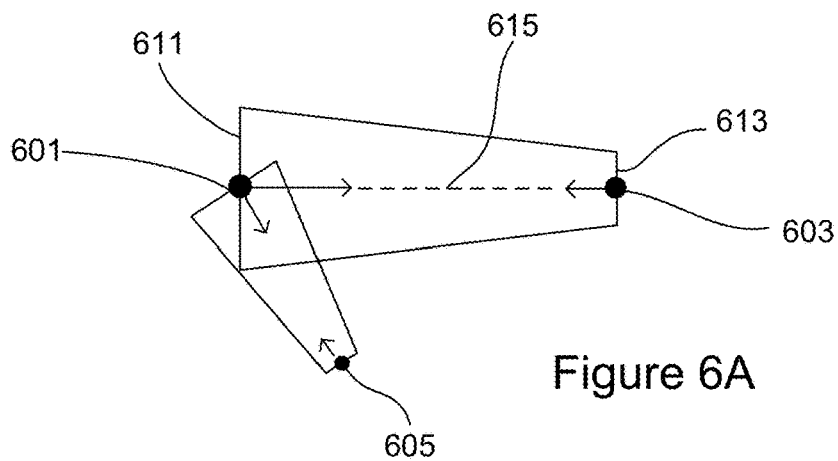
FIG. 6A shows a plan view of a conceptual diagram indicating how a further embodiment of the present invention is implemented.

A description of how the graphical representation of the flow distribution between nodes is calculated is now described with reference to FIGS. 6A & 6B. The image in FIG. 6A is showing a two dimensional plan view representation of the three dimensional image of FIG. 6B. These images show how the values are calculated in order to render the heatmap according to the methods described herein.

FIG. 6A shows a plan view of how the graphical heatmap representation according to this embodiment is created. Three data points (601, 603, 605) are shown. Flow values are calculated as described above from one point to the other points. That is, a flow value is calculated to indicate the flow from data point 601 to data point 603. Further, a flow value is calculated to indicate the flow from data point 603 to 601. Also flow values are calculated in both directions between data points 601 and 605.

Figure 6B:
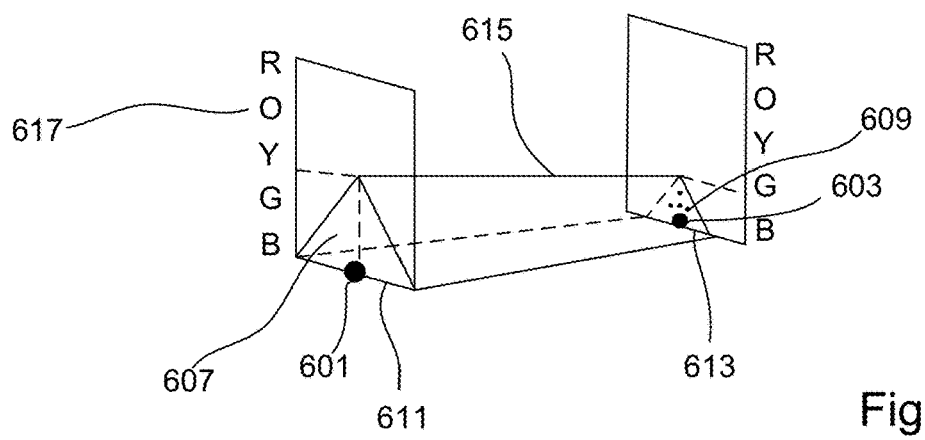
FIG. 6B shows a three dimensional perspective view of the conceptual diagram of FIG. 6A.

FIG. 6B shows a perspective conceptual view of the amount of flow between each of the data points 601 and 603. It will be understood that the calculations made for these data points are similarly made for all other interconnected data points, such as data points 601 and 605. In order to represent the flow out of data point 601 to point 603, and the amount of flow out of data point 603 to data point 601, a triangle shaped prism distribution is calculated.

The dimensions of a first triangle 607 associated with data point 601 is first calculated, and then the dimensions of a second triangle 609 associated with data point 603 is then calculated. The height of each of the first and second triangles (607, 609) is based on the calculated flow out of the associated data point. Further, the angle between the base and sides of the triangles is fixed such that the base length is also related to the calculated flow out of the associated data point.

The base length 611 of the first triangle 607 is indicated in FIG. 6A as one of the opposing parallel sides of what is viewed as a trapezoid (in two dimensional terms) in the plan view. The base length 613 of the second triangle 609 is indicated in FIG. 6A as the other opposing parallel side of the trapezoid.

Referring back to FIG. 6B, the apexes of the first and second triangles are joined together to form an interconnecting apex 615. Also, the opposing points of the first and second triangles are joined together to form a three dimensional triangular prism distribution. The prism has five sides. First and second sides are opposing and are formed from the first and second triangles, the surfaces of which are parallel to each other. A third side forms the base of the prism. The base is substantially what is seen in FIG. 6A as viewed from the top of the distribution. The fourth and fifth sides slope from either side of the apex 615 to the edge of the base.

In order to graphically represent the distribution, color values are assigned to the different areas of the distribution based on the height at that particular area. A color distribution 617 is provided with the color range from Red to Orange, Yellow, Green and finally Blue. These varying colors provide a "heat" representation associated with the flow between the data points. As in the first embodiment, other alternative forms of representing heat may be used other than color.

The apex of the prism 615 slopes downwards from the apex of the first triangle 607 to the apex of the second triangle 609 due to the height of the second triangle 609 being less than the height of the first triangle 607. That is, the flow from data point 601 to data point 603 is greater than the flow from data point 603 to data point 601. Likewise, the base 611 of the first triangle 607 is longer than the base 613 of the second triangle 609 for the same reasons.

Therefore, the graphical representation clearly indicates the amount or intensity of flow (the heat assigned to the areas on the prism's side surfaces) emanating from each of the data points, as well as the direction of the predominant flow between the data points. That is, the predominant flow is indicated both by the wider areas of the trapezoid as viewed in the plan view as well as the "hotter" areas as represented using the heat mapping technique described.

Figure 6C:
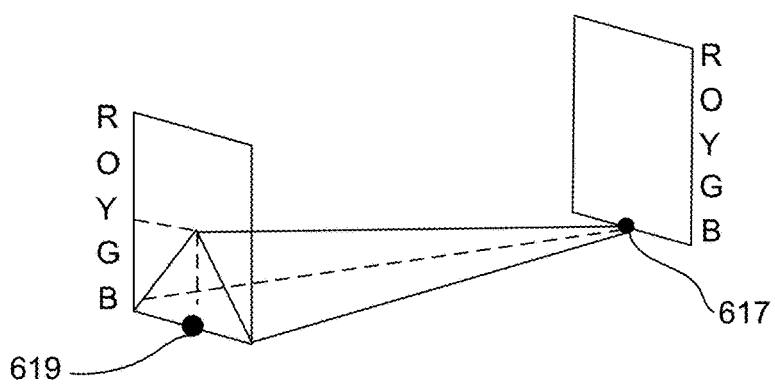
FIG. 6C shows a plan view of a conceptual diagram of a further example according to an embodiment of the present invention.
Figure 6D:
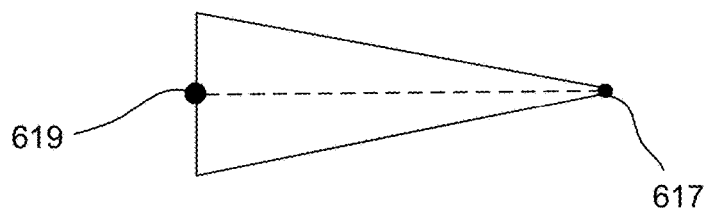
FIG. 6D shows a three dimensional perspective view of the conceptual diagram of FIG. 6C.

Using the above described method, it will be understood that if the flow out of a first data point 617 as shown in FIGS. 6C and 6D (plan view) towards a second data point 619 is calculated as zero, i.e. the flow is only in one direction from the second data point 619 to the first data point 617, then the graphical representation will show a triangular distribution when viewed as a plan where the base of the triangle lies across the second data point 619 and the apex (or point) sits on the first data point 619.

Figure 7:
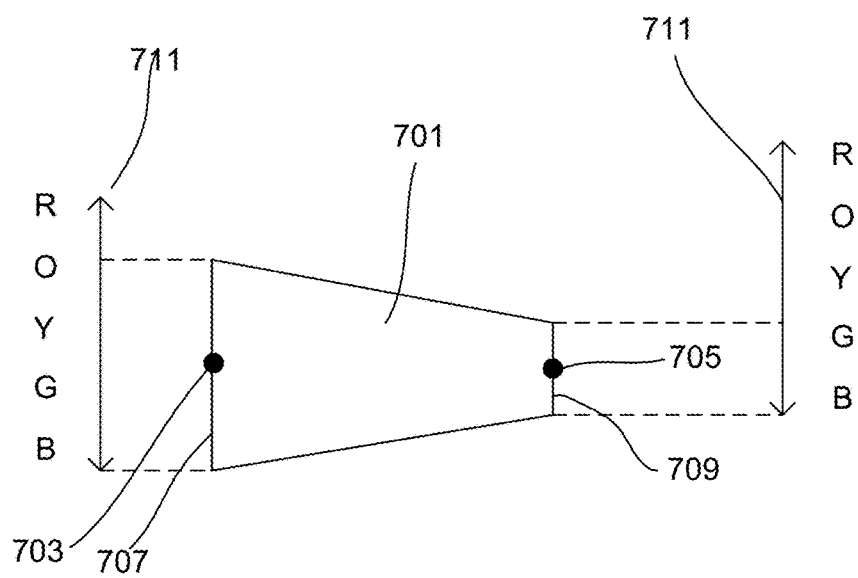
FIG. 7 shows a plan view of a conceptual diagram indicating how a further embodiment of the present invention is implemented.

As an alternative to this embodiment, a simpler calculation may be made to represent the flow emanating from specific data points as well as the predominant flow between data points, as shown in FIG. 7. For example, calculations may be carried out in two dimensions only using a trapezoidal data distribution 701 between a first data point 703 and a second data point 705. A first parallel side 707 of the trapezoid may be placed centrally over the first data point 703 and a second parallel side 709 centrally over the second data point 705. The lengths of each of the parallel sides of the trapezoid are then calculated based on the calculated flow values emanating from the data point. Further, colors from a range of colors 711 may be assigned across varying widths of the trapezoid from the first parallel side through to the opposing parallel side such that longer lengths are assigned a hotter color. For example, as shown in FIG. 7, the first parallel side will be assigned the color Orange, whereas the second parallel side will be assigned the color Yellow. The coloring of the distribution from the first parallel side will flow from Orange through to Yellow where the distribution ends at the second parallel side.

As a further option, each of the nodes may be graphically represented to show how many individuals enter at that node. The representation method used to show this information is a conical visualization method as described in the applicant's co-pending application, and reproduced herein.

It will be understood that nodes may be grouped together and flow between groups of nodes may be recorded and visually represented rather than just indicating flow between single nodes.

Figure 8:
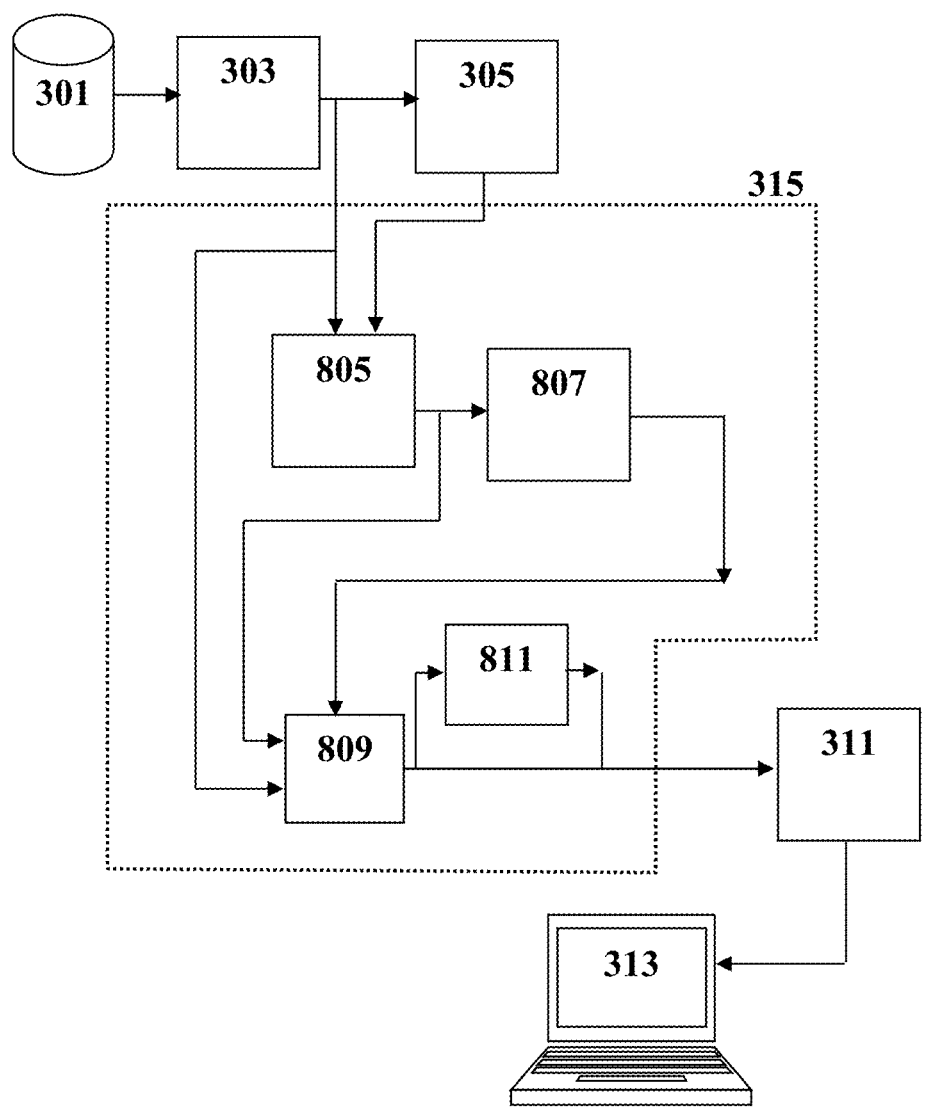
FIG. 8 shows a system block diagram of a cone generation module according to an embodiment of the present invention.

The conical visualization method is performed by the cone generation module 315 in FIG. 5A. FIG. 8 shows details of the various modules implemented within the cone generation module 715.

The data storage module 301 provides data to the data retrieval module 303 upon request from the data retrieval module, as described above.

A data point calculation module 805 receives or accesses the data from the data retrieval module 303 and node determination module 305 in order to calculate the values on and around each of the data points, as will be described in more detail below. In summary, the data point calculation module 805 applies a geometric spatial distribution in the form of a substantially conic distribution about the data point based on the data point value. In this first example an exact conical distribution method is used. However, it will be understood that the terms cone, conic or conical distribution include other conic type distribution forms that may be applied other than the exact conic form in order to produce the advantages of the present invention. Indeed, the shape of the distribution around a data point may be tailored to the type of data being analyzed. Certain forms of data may be more suited to certain types of conic distribution in order to more accurately display the data's properties.

A minima check module 807 performs a check on each of the calculated data point values for each of the data points to see whether the value generated for the data point using the data point calculation module 805 is greater than the actual value of that data point. This may occur where two data points are close to each other such that a first data point representing a large value swamps a second data point representing a smaller value. That is, if the heatmap were rendered, the minima value being represented by the second data point would not be shown after the data point calculation module has made the required calculations because the cone generated by the data point calculation module for the first data point engulfs the minima value of the second data point.

If the minima check module 807 determines that the associated data point value has been hidden by an adjacent larger data point, a data point inverse calculation module 809 is activated to calculate an inverse data point value, as described in more detail below.

That is, the data point inverse calculation module 809 receives the calculation data from the data point calculation module 805 and/or data retrieval module 303, and uses this data to calculate values on and around data points that represent minima values. These minima values are those that the minima check module detected have been hidden from view due to larger values associated with a nearby data point.

Optionally, a drop off smoothing function module 811 may be used to calculate drop off values for the edges of the calculated data points in order to provide a smoother looking image, as will be described in more detail below with reference to FIG. 10C. The output of the drop off smoothing function module is communicated to the rendering module 311.

The rendering module 311 receives the output of the data point calculation module, inverse data point calculation module and drop off smoothing function module (if used) to render the conic distribution around the data points. This rendered image is then provided to an output module 313. That is, the rendering module uses the values calculated by the various modules to create a suitable output signal or file that enables a heatmap image to be rendered on the desired output module, as discussed above.

Figure 9:
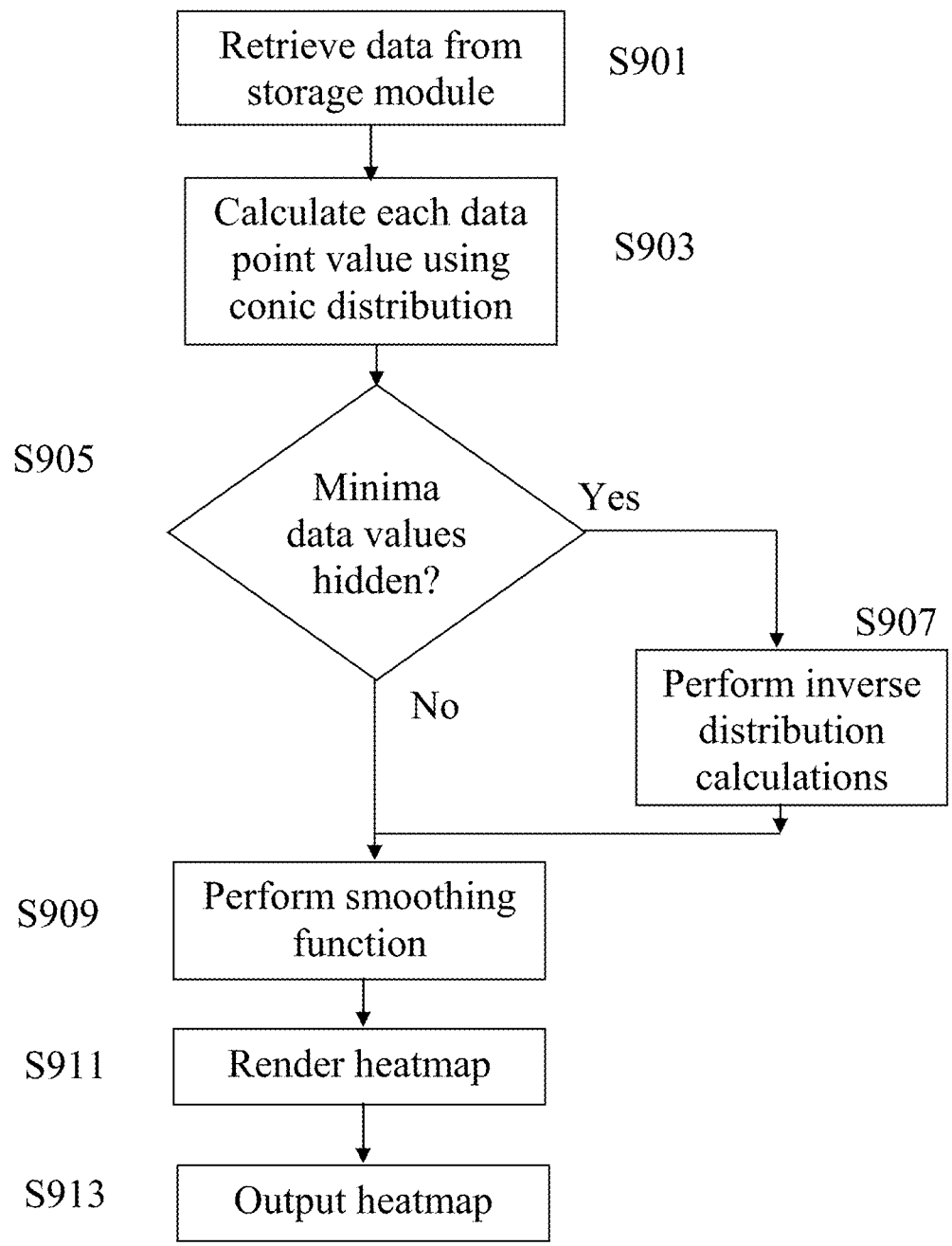
FIG. 9 shows a flow diagram for performing a heatmap generation method according to an embodiment of the present invention.

FIG. 9 shows a flow diagram for producing a conic representation according to this example.

At step S901, the data retrieval module retrieves data from the data storage module.

At step S903, data point values are calculated for and around each data point using the data point calculation module distribution calculations.

At step S905, a minima data check is performed by the minima check module to see whether any of the data point values calculated by data point calculation module exceed the actual data value that the data point is supposed to represent.

At step S907, for each data point detected that has a minima data value that is hidden, an inverse data point value is calculated by the inverse data point calculation module using an inverse distribution.

At step S909, the drop-off values are optionally calculated using the drop-off smoothing function module at the edge of data points to provide smoothing.

At step S911, the heat map image is rendered by the rendering module using the values calculated by the data point calculation module and inverse data point calculation module, and optionally the drop off smoothing function module.

At step S913 the rendered image produced by the rendering module is output on the output device.

There are certain key elements that a graphical visualization system designer should bear in mind when determining how and in what form a graphical image is to be visualized. For example, the graphical image should be visually pleasing to the user eye, understandable to the user such that it conveys relevant information about the data being represented and able to be efficiently produced by the system. The method of producing the image using a conic representation as described herein is far more efficient than previously produced heatmaps, such as that shown in FIG. 1 for example.

The cone shaped distribution method used in this example for rendering the image is described in more detail below with reference to FIGS. 10A, 10B, 10C, 11A and 11B.

Figure 10A:
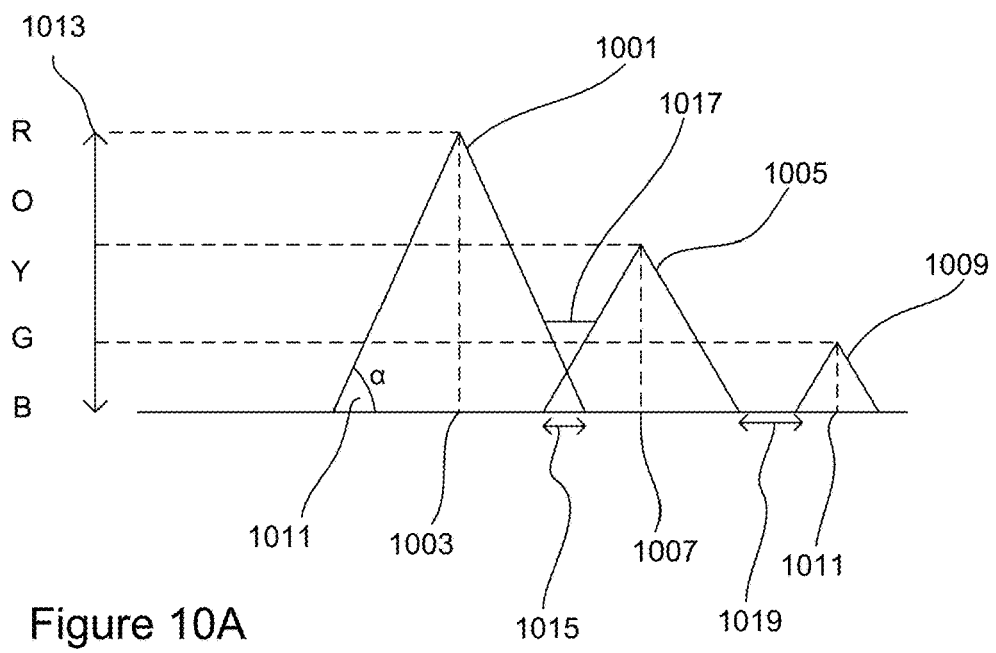
FIG. 10A shows a cross sectional view of a conic heatmap according to an embodiment of the present invention.

FIG. 10A shows a cross sectional view representative of a conic representation according to this example. Data point value distributions are applied to and around each data point. According to this particular example, the data point values are distributed using an exact cone shaped distribution.

Cone distribution 1001 is calculated to represent data for data point 1003, cone distribution 1005 is calculated to represent data for data point 1007 and cone distribution 1009 is calculated to represent data for data point 1011. Each cone distribution is sized according to the value of the data being represented at the associated data point.

According to this embodiment, the internal angle 1011 between the base and side of each cone distribution is fixed. Therefore, as the data point value increases and decreases, the height and base of the cone varies.

It will be understood that, as an alternative, the internal angle may be variable such that different value data points are represented by higher cones using a larger internal angle and smaller value data points are represented by shorter cones using a smaller internal angle. It will be understood that the base for this alternative is fixed for each cone.

It can be seen in FIG. 10A that cone distribution 1001 has a higher data point value than both of cone distributions 1005 and 1009. Further, cone distribution 1005 has a higher data point value than cone distribution 1009. That is, cone 1001 is representative of a data point with a higher value than the data points which cones 1005 and 1009 represent.

Each of the conic distributions effectively provides each data point with a further dimension in which to represent a variable "Z". That is, the further dimension is the "height" of the data point, which indicates the "Z" variable for the data point being represented.

The values for each data point on the heatmap may be represented using colors or grey scales wherein the value calculated by the data point calculation module for each data point is represented using a range of colors or grey scales and the color chosen from the scale varies based on the calculated value for the distribution used.

According to this example, a color scale 1013 is provided to graphically indicate the height of the cone for each data point. The scale is the spectrum, form Red, through to Blue, including Orange, Yellow and Green in sequence. For example, the height of cone 1001 is level with the Red scale, and so the cone will be colored in Red. The height of cone 1005 is level with the Orange/Yellow scale, and so will be colored accordingly. The height of cone 1009 is level with the Green scale and so will be colored Green.

In order to take into account the interaction of two overlapping cones, such as, for example, the cone distributions 1001 and 1005, color values are calculated by the data point calculation module and smoothed (or accumulated) for the overlapping region 1015 on the heatmap. That is, the total value of the overlap is taken into account to indicate the cumulative (or additive) effect of the overlap.

Referring to FIG. 10A the cumulative sum of the heights (as indicated on the y-axis) of the cones is calculated using the data point calculation module across the x-axis to produce a cumulative value 1017 for the combined cones. It will be understood that the height of the cones shown in FIG. 10A represent a specific variable value associated with the data points.

The cumulative effect of the overlap of two distribution regions is represented in the heatmap by a line 1017, where the color of the line is determined by calculating the accumulated values of the crossed over distributions 1001 and 1005. The calculated accumulated value is then used to render the line in the associated color. In this example, the area on the heatmap representing this crossover portion is rendered using a color within the color range that aligns with accumulated value rather than the value that aligns with the exact point of cross over.

As an alternative, the overlap between the two distribution regions may be represented by using the higher of the two distribution values. That is, a cumulative or additive effect is not produced, but instead the outline of the distribution is maintained to indicate the highest distribution value of either of the overlapping distributions.

Optionally, a drop off function may be applied by the drop off smoothing function module to the edges of the cones to allow the values to drop more smoothly from the cone region into the areas 1019 of the map that have no distribution. The steepness of the drop off function may be based on the height of the cone to enable a steeper drop off for shorter cones, and a shallower drop off for taller cones. For example, referring to FIG. 10C, a cross sectional view of a conic heatmap with a drop off smoothing function can be seen. The cone distribution 1005 includes drop off smoothing lines 1021A and 1021B calculated by the drop off smoothing function module. The cone distribution 1009 includes drop off smoothing lines 1021C and 1021D also calculated by the drop off smoothing function module. Therefore, the colors used to represent the edges of the cones where they meet the minimal value (or background value) associated with the heatmap drop off more smoothly or in a shallower manner to provide a more aesthetic graphical image. The drop off smoothing function may be any suitable smoothing calculation. For example, a Gaussian blur function as described at en.wikipedia.org/wiki/Gaussian_blur may be used.

Figure 10B:
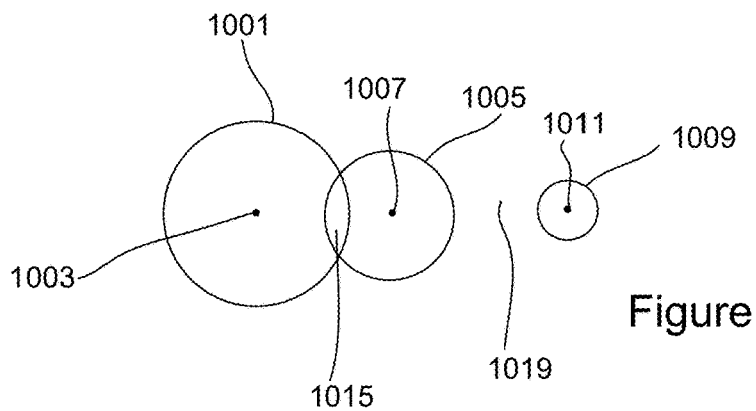
FIG. 10B shows a plan view of the cross section shown in FIG. 10A.
Figure 10C:
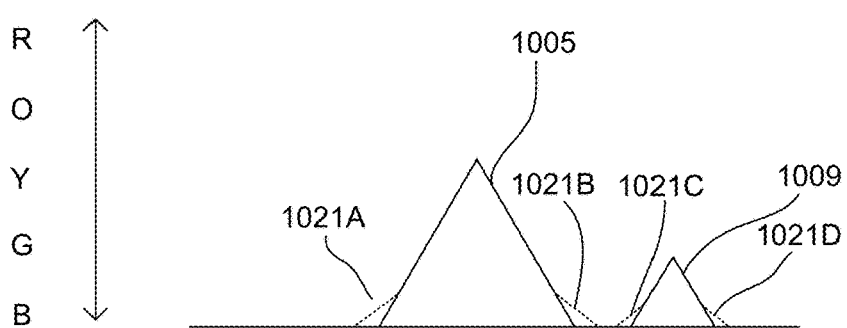
FIG. 10C shows a cross sectional view of a conic heatmap with a drop off smoothing function according to an embodiment of the present invention.

FIG. 10B shows a plan view of the cross section shown in FIG. 10A. The base of cone 1001 is displayed next to the base of cone 1005, with an overlap portion 1015. The color of the base of cone 1001 is red, which then blends into the color of cone 1005, which is green/yellow. There is a cumulative effect at the overlap section as described above.

To take into account data points of a small value (e.g. minima) that are close to data points of a larger value (e.g. maxima), the following method may be used so that the smaller data point values are not swamped by the larger data point values and so can still be indicated on the graphical representation.

The minima check module determines whether the data values are correctly represented, i.e. that the calculated value is not greater that the actual value associated with the data point. If it is determined by the minima check module that the calculated values do not correlate with the actual data value, the inverse distribution is calculated as described below. The inverse distribution uses an exact conic distribution that is the inverse of the exact conic distribution used by the data point calculation module described above. That is, the cone shape is turned upside when viewing the cone as a cross section so that the apex of the cone is pointing towards the data point being represented.

Figure 11A:
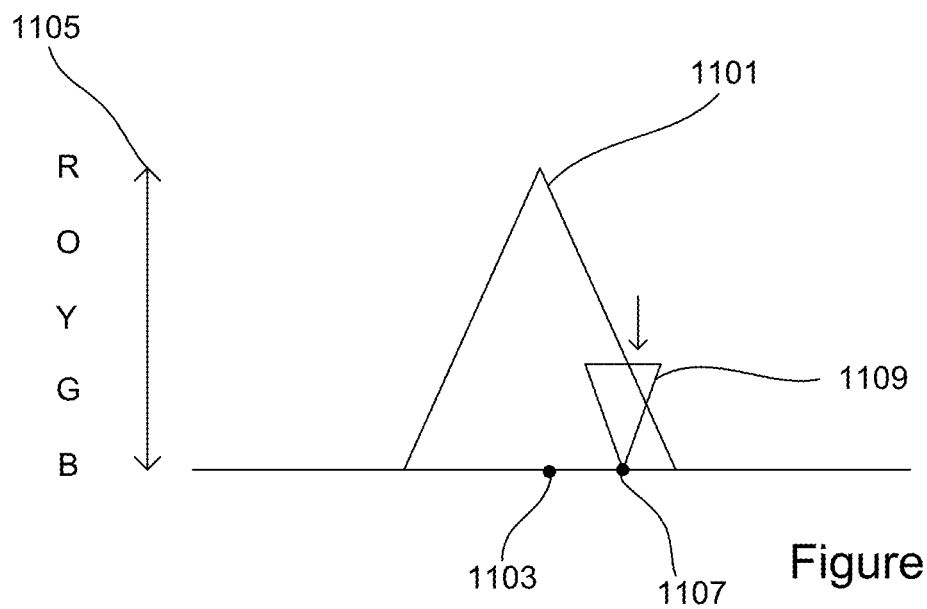
FIG. 11A shows a cross sectional view of a conic heatmap according to an embodiment of the present invention.

FIG. 11A shows a cross sectional view indicating how a data point may be rendered using the inverse data point calculation module. This may be particularly useful where flow indications between data points that are grouped together are graphically represented and it is also desirable for individual values of data points to be accurately visually represented.

A first cone 1101 indicating a larger value for a data point 1103 is shown and represented using a color in the spectrum range 1105, as discussed above.

A further smaller data point 1107 (minima) is also present which is to be represented on the heatmap. However, this value is swamped by the calculated distribution. Therefore, the data for that smaller data point is represented by applying an inverse cone shaped distribution around the data point. An inverse cone 1109 is applied by utilizing the same methodology as the cone shaped distribution, but in reverse (or upside down), so that the tip of the cone is placed on the surface of the representation with the base rising upwards to the appropriate point on the spectrum scale 1105.

By applying an inverse cone as described, the value of its associated data point 1107 is "drilled" through the larger cone 1101 so that the data point value can be represented or viewed through the larger cone. That is, a hole is effectively created through the surface of the larger cone so the smaller data value can be visualized.

The overlap of the two cones may provide a cumulative effect on the spectrum value in that area by subtracting the data value for the minima as represented by data point 1107 from the data value for the maxima as represented by data point 1103.

Alternatively, the overlap of the cone distributions may be calculated by taking the minimum of the two data distribution values where they overlap.

Figure 11B:
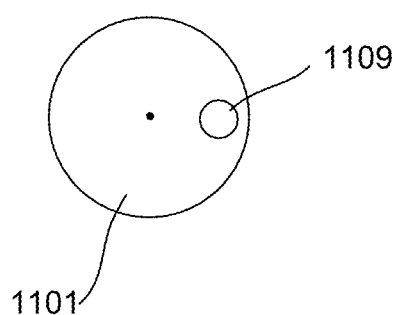
FIG. 11B shows a plan view of the cross section shown in FIG. 11A.

FIG. 11B shows a plan view of the cross section shown in FIG. 11A. As can be seen in FIG. 11B, the base of cone 1101 would be represented in Red, whereas the base of cone 1109 would be represented in a Green/Blue color thus providing a clear indication in the graphic that there is a minima value present in the area.

The colors between the two bases of the cones may be blended to provide a less garish and more pleasing image. For example, referring to FIG. 11B, a smoothing function may be applied around the edge 1111 of the smaller inverse cone to provide a smoothing effect at the boundary 1111 with the larger cone.

The cone generation examples herein described provide significant advantages over the prior art. For example, the computational efficiency of calculating the heatmap values is increased as no interpolation steps are required. Further, spread functions that require a large amount of processing power are not required. Also, the metrics represented are true representations of the values of data associated with the source points.

Further, the data from one source point has no effect on distant points, unlike the traditional distribution curve where points affect distant points. This means that the calculations performed using the herein described methods do not require threshold or limiting values (which can create distortions in the representation of the true values).

Further, the data points are represented using substantially conic distributions, which are less organic in nature than typical heatmaps and so it becomes possible for a user to see and determine values from the heatmap more accurately.

This is because cone geometries are more deterministic in nature compared with the distributions used to form prior known heatmaps. Also the use of the various geometries described herein enables the source points to be made visibly clearer.

Therefore, a surface may be constructed that represents a heatmap together with the appropriate source point coordinates to form the basis of an accurate representation that can be subject to measurement for precise data representation; Thus providing a higher degree of metric representation.

For example, in a gaming environment, where the conic methods described herein are used to represent data associated with a gaming floor, a user may be able to determine the value of a source point to within 1-3% of its actual value rather than 2-5% for a traditional heatmap.

According to the herein described methods a surface is not created to form the data point representations, as performed in prior known methods. Rather, a graphical method is provided to indicate the data values associated with the data points.

The same system components as used above in the first conic data point generation example are also used in this second conic example.

As mentioned above, the conic distribution of the data value around a data point may be carried out using other suitable conic type forms of distribution. According to this example, the data point values are distributed using a frustoconical or "tent" shaped distribution as applied by the data point calculation module and inverse data point calculation module.

Figure 12A:
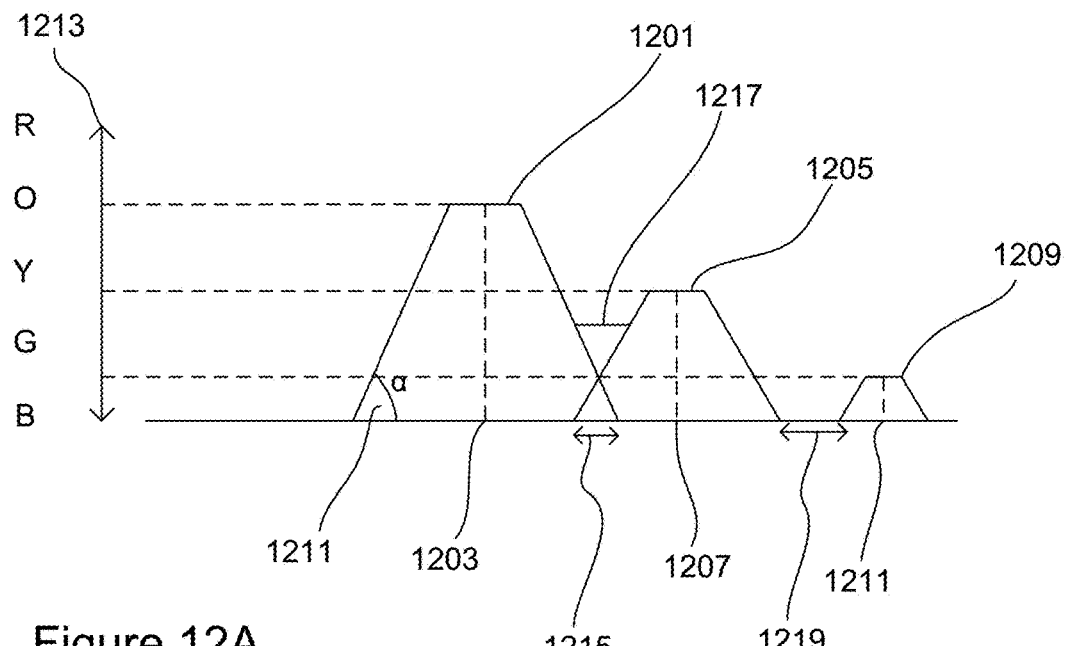
FIG. 12A shows a cross sectional view of a conic heatmap according to an embodiment of the present invention.

Referring to FIG. 12A a cross sectional view is provided that indicates how a heatmap is rendered using the data point calculation module of the first embodiment modified to use a frustoconical distribution.

Figure 12B:
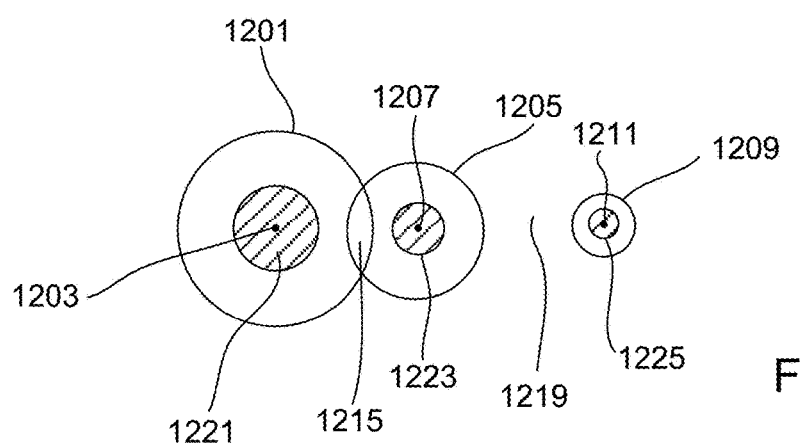
FIG. 12B shows a plan view of the cross section shown in FIG. 12A.

Referring to FIG. 12B a plan view of the cross section shown in FIG. 12A is provided.

According to this example, a color scale 1213 is provided as in the first embodiment. The heights of the frustoconical distributions 1201, 1205 and 1209 determine the color used to render the distribution.

Values are calculated by the data point calculation module in the same manner as described in the first example but using a different distribution around the data point.

Referring to FIG. 12A the cumulative sum of the heights (as indicated on the y-axis) of the distributions is calculated using the data point calculation module across the x-axis to produce a cumulative value 1217 for the combined distributions. It will be understood that the height of the frustoconical shapes shown in FIG. 12A represent a specific variable value associated with the data points.

The cumulative effect of the overlap of two distribution regions is represented in the heatmap by a line 1217, where the color of the line is determined by calculating the accumulated values of the crossed over distributions 1201 and 1205. The calculated accumulated value is then used to render the line in the associated color.

As in the first example, the overlap may be calculated by taking the maximum of the two distributions rather than applying an additive algorithm.

Optionally, as in the first example, a drop off function may be applied by the drop off smoothing function module to the edges of the distributions to allow the values to drop more smoothly from the frustoconical region into the areas 1219 of the map that have no distribution.

FIG. 12B shows a plan view of the cross section shown in FIG. 12A. The base of frustoconical distribution 1201 is displayed next to the base of frustoconical distribution 1205, with an overlap portion 1215. Further, the top of the frustoconical distribution 1201 is visible as an area 1221, for distribution 1205 as an area 1223 and for distribution 1209 as an area 1225.

To take into account data points of a small value (e.g. minima) that are close to data points of a large value (e.g. maxima), the same method as used in the first example is used in this example to ensure that the smaller data point values are not swamped by the larger data point values and so can still be visualized on the graphical representation.

The minima check module determines whether the data values are correctly represented, i.e. that the calculated value is not greater that the actual value associated with the data point. If it is determined by the minima check module that the values are not correctly calculated, then the inverse distribution is calculated, as in the first example.

Figure 13A:
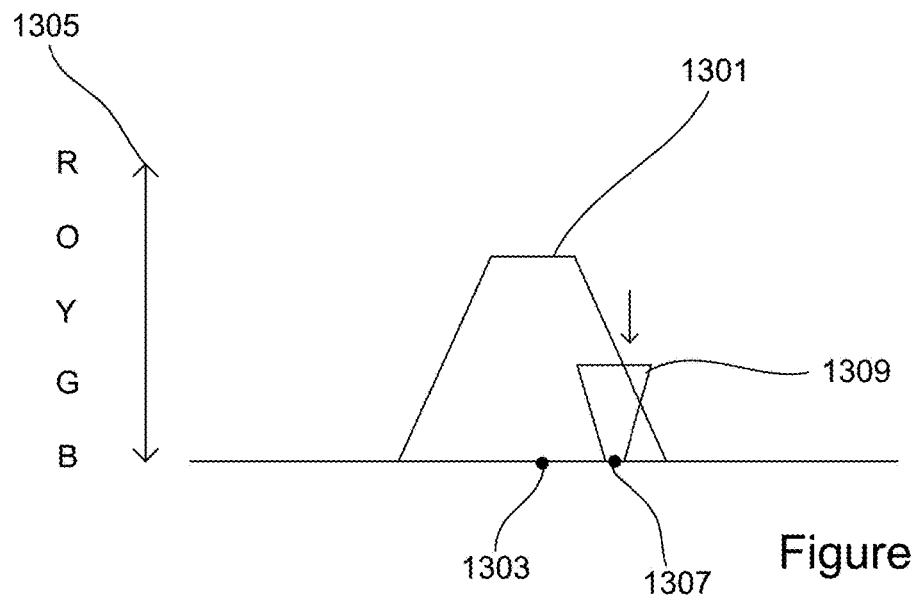
FIG. 13A shows a cross sectional view of a frustoconical heatmap according to an embodiment of the present invention.

FIG. 13A shows a cross sectional view indicating how a heatmap is rendered using the inverse data point calculation module.

A first frustoconical distribution 1301 indicating a larger value for a data point 1303 is shown and represented using a color in the spectrum range 1305, as described in the first example.

A further smaller data point 1307 (minima) is also present which is to be represented on the heatmap. The data for that smaller data point is represented by applying an inverse frustoconical shaped distribution around the data point. An inverse distribution 1309 is applied in the same manner as described in the first example. Therefore, the top surface of the frustoconical distribution is positioned on the x-axis (i.e. upside down).

By applying an inverse distribution as described, the value of its associated data point 1307 is drilled through the larger distribution 1301 so that it can be viewed in a similar manner as described in the first example.

The overlap of the two distributions may provide a cumulative effect on the spectrum value in that area by subtracting the data value for the minima as represented by data point 1307 from the data value for the maxima as represented by data point 1303.

As in the first example, the overlap may be calculated by taking the minimum of the two distributions rather than applying a cumulative algorithm.

Figure 13B:
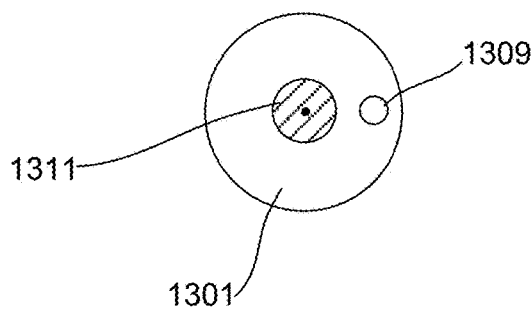
FIG. 13B shows a plan view of the cross section shown in FIG. 13A.

FIG. 13B shows a plan view of the cross section shown in FIG. 13A. As can be seen in FIG. 13B, the distribution 1301 would be represented according to the color scale 1305. An area 1311 represents the top flat surface of the frustoconical distribution, whereas the base of the distribution 1309 is represented. This therefore provides a clear indication in the graphic that there is a minima value present in the area.

As in the first example, a smoothing function may be applied around the edges of the distributions.

The same system components as used above in the above first and second examples are also used in this third example.

Again, as mentioned above, the conic distribution of the data value around a data point may be carried out using other suitable conic type forms of distribution. According to this example, the data point values are distributed using a skewed conic distribution as applied by the data point calculation module and inverse data point calculation module.

Figure 14A:
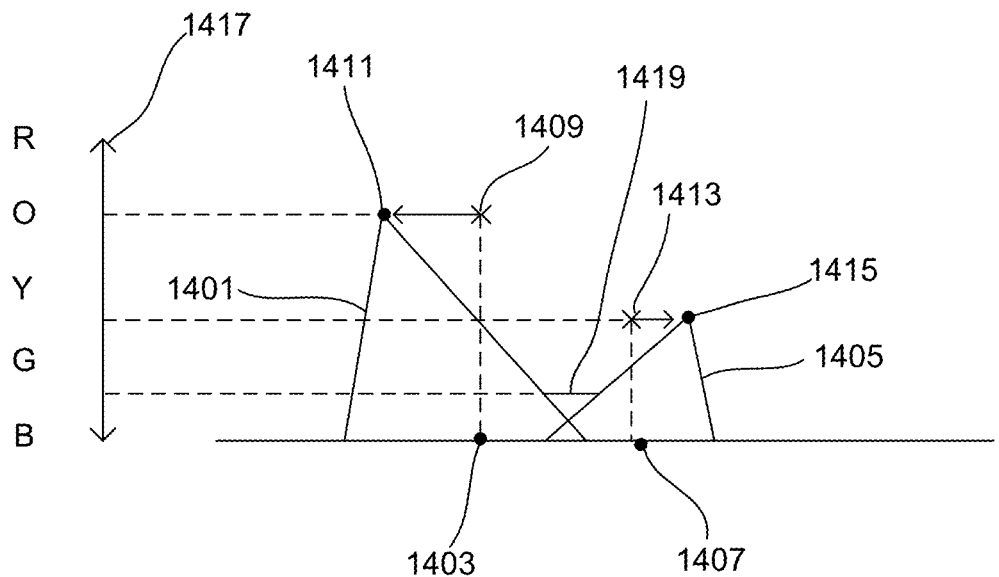
FIG. 14A shows a cross sectional view of a skewed conical heatmap according to an embodiment of the present invention.

Referring to FIG. 14A, skewed cone distribution 1401 is used to represent data for data point 1403, and skewed cone distribution 1405 is used to represent data for data point 1407. For a standard cone distribution, the tip or apex of the cone 1401 would be in the position indicated by point 1409.

However, according to this example, the apex is moved from point 1409 in the direction of the arrow to point 1411 to form a skewed conic distribution. Also, for a standard cone distribution, the tip or apex of the cone 1405 would be in the position indicated by point 1413. However, according to this example, the apex is moved parallel to the base from point 1413 in the direction of the arrow to point 1415 to form a skewed conic distribution.

In this example, the rendering of the distribution utilizes the same color mapping techniques as described above by using a color scale 1417. Other forms of rendering are envisaged as described in the previous examples.

By using a skewed conic distribution as described, the overlap of the cones forms a line 1419. The color value for this line is lower than that of the standard cone distribution. Thus, the visual appearance of the actual values of the source points (1403 and 1407) is enhanced. That is, the overlap values of the skewed cones have a reduced effect on the visual representation thus producing an increased visual effect of the actual source points. Further, individual points are distinguished whilst maintaining the overall effect of all data points in the representation.

As in the above described examples, the overlap may be calculated by taking the maximum of the two distributions rather than applying an additive algorithm.

Figure 14B:
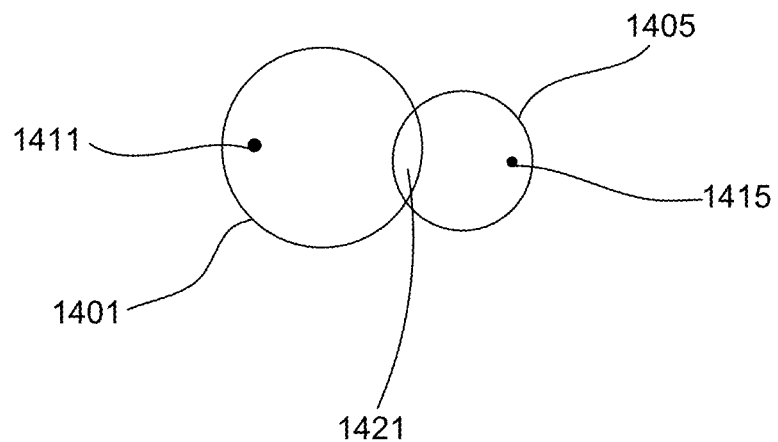
FIG. 14B shows a plan view of the cross section shown in FIG. 14A.

FIG. 14B shows a plan view of the representation where the overlap area 1421 appears as the same size as would appear if a standard conic distribution were used. However, the color value attributed to that area has a lower heat value so that the source point values are enhanced.

It will be understood that the inverse conic methods described above in the previous examples may also be applied to this example where they are adapted to apply an inverse skewed cone distribution.

The data visualization techniques herein described in the various embodiments transform the raw data received into a visual representation of the data to enable further or hidden information within the raw data to be visually represented in a manner that conveys the information to a user in an efficient manner. For example, both fine detail and course detail associated with the data is easily interpretable from the heatmap produced using the various methods.

Further Embodiments

It will be understood that the embodiments of the present invention described herein are by way of example only, and that various changes and modifications may be made without departing from the scope of invention.

It will be understood that the method steps described above may be implemented using any suitable tool. For example, the method may be implemented using software code developed to perform the described methods. Alternatively, the method may be implemented using a programmed chip set arranged to perform the method steps. For example, the chip set may form part of a printing device specifically arranged to carry out the method of producing the herein described heatmaps. The chip set may be a hardwired chip set, programmable chip set, or software controlled chip set. Further, a hard wired or programmable computer system may be used to carry out the method steps.

Figure 15:
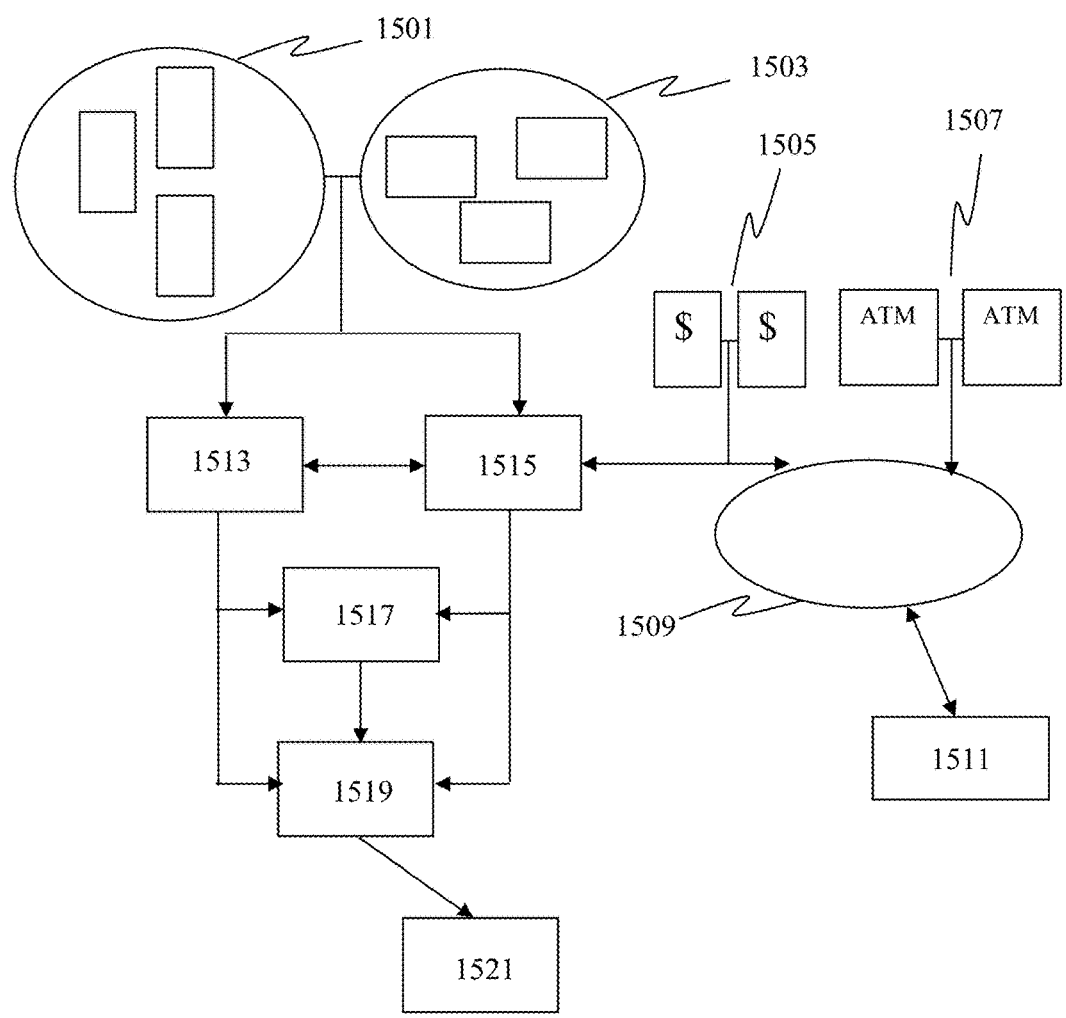
FIG. 15 shows a system diagram of a gaming environment according to an embodiment of the present invention.

FIG. 15 shows an example of how the herein described system 1519 may be incorporated within a gaming environment. The gaming environment consists of a number of gaming machines 1501 and electronic tables 1503 (among other electronic gaming devices) that are adapted to communicate electronically with other systems using any suitable protocols, such as data packet protocols.

The gaming environment further includes a number of electronic cashier devices 1505 and ATMs 1507 which are in communication via a Wide Area Network 1509 with one or more financial databases 1511.

Data from the gaming machines 1501 and electronic tables 1503 are transferred to a reward program database 1513 and customer database 1515. It will be understood that these two databases may be combined into a single database.

Data from the cashier devices are also transferred to the reward program database 1513 and customer database 1515. The databases 1513 and 1515 are in communication with a central hotel management system 1517 that oversees the operation of the gaming environment, including the activities of customers in other areas of a casino, such as shops, hotels, spas etc.

The visualization system 1519 described herein is in communication with the reward program database 1513, customer database 1515 and central hotel management system 1517 so the system can retrieve all necessary data about the activities within the gaming environment. The various embodiments as described herein are employed by the system 1519 to provide an output 1521.

The system as described with reference to FIG. 15 may be particularly useful for visualizing of data used to track people walking around a gaming environment, such as a casino. For example, the traffic (people) between different gaming assets or areas may be recorded via closed circuit television, cameras, monitoring of credit card use, loyalty card use or recognition techniques (such as, for example, facial, voice, gait or appearance recognition etc). Such a system could be particularly useful in indicating which assets are first used by people entering the casino (i.e. the entry nodes of the system), and enable gaming environments to be adjusted accordingly to enable maximum profitability.

What we claim is:

1. A method of creating a graphical representation of data points in the form of a heatmap wherein the heatmap represents a plurality of multi-directional flow values between the data points, the method including the steps of:
    positioning data points at respective data point locations on a heatmap for graphical representation;
    calculating bi-directional flow values between data points, at least two data points having bi-directional flow values to at least two other data points;
    determining the intensity and direction of a predominant flow from the bi-directional flow values;
    calculating weighted heat values for an area on the heatmap based on the bi-directional flow values near the area, the distance the bi-directional flow values are from the area and flow start values for the data points;
    for each data point, representing flow start values at the respective data point by calculating respective conical data distribution values around the respective data point based on the flow start value associated with the respective data point, wherein each conical distribution comprises a set of locations and a unique distribution value corresponding to each location in a respective region centered on the respective data point location;
    for each data point, determining whether the calculated respective conical data distribution values of other data points at the respective data point location are greater than the flow start value associated with the respective data point;
    upon a positive determination, calculating inverse conic data distribution values around the respective data point based on the flow start value associated with the respective data point; and graphically representing the predominant flow, the bi-directional flows between the data points, the calculated weighted heat values, the calculated conical data distribution values and the calculated inverse conic data distribution values in the heatmap.

2. The method of claim 1, further including the step of calculating the weighted heat values by calculating a weighted distance function.

3. The method of claim 2, wherein the weighted distance function is an inverse distance weighted (IDW) function.

4. The method of claim 1, further including the step of:
calculating a trapezoid distribution between the first and second data point, where the length of the parallel surfaces of the trapezoid distribution at the data points is based on the value of the calculated flow emanating from each represented data point.

5. The method of claim 1, further including the step of:
calculating a triangular prism distribution between the first and second data point, where the height of the triangular prism at each data point is based on the value of the calculated flow emanating from each represented data point.

6. The method of claim 5, wherein the prism height corresponds to one or more of a range of colors or shadings.

7. The method of claim 1, wherein the conical data distribution values are calculated by applying one of a frustoconical distribution, an exact conical distribution or a skewed conical distribution to the data value.

8. The method of claim 7, wherein the inverse conical data distribution values are calculated by applying one of an inverse frustoconical distribution, an exact inverse conical distribution or a skewed inverse conical distribution to the data value.

9. The method of claim 1, wherein the inverse conical data distribution values are calculated by applying one of an inverse frustoconical distribution, an exact inverse conical distribution or a skewed inverse conical distribution to the data value.

10. A graphical computing system for creating a graphical representation of data points in the form of a heatmap wherein the heatmap represents a plurality of multi-directional flow values between the data points, the system including:
a processor;
a memory device;
a node determination module executable by the processor arranged to position data points at respective data point locations on a heatmap for graphical representation;
a flow determination module executable by the processor arranged to calculate bi-directional flow values between data points, at least two data points having bi-directional flow values to at least two other data points;
a heat determination module executable by the processor arranged to calculate the intensity and direction of a predominant flow from the bi-directional flow values and further arranged to calculate weighted heat values for an area on the heatmap based on the bi-directional flow values near the area, the distance the bi-directional flow values are from the area and flow start values for the data points;
a cone generation module executable by the processor arranged for each data point to represent flow start values at each respective data point by calculating respective conical data distribution values around the respective data point based on the flow start value associated with the respective data point, wherein each conical distribution comprises a set of locations and a unique distribution value corresponding to each location in a respective region centered on the respective data point location, wherein the cone generation module executable by the processor is further arranged to for each data point determine whether the calculated respective conical data distribution values of other data points at the respective data point location are greater than the flow start value associated with the respective data point, and upon a positive determination, calculate inverse conic data distribution values around the respective data point based on the flow start value associated with the respective data point; and
a rendering module executable by the processor arranged to graphically represent the predominant flow, bi-directional flows between the data points, the calculated weighted heat values, the calculated conical data distribution values and the calculated inverse conic data distribution values in the heatmap.

11. The system of claim 10, wherein the heat determination module executable by the processor is further arranged to calculate the weighted heat values by calculating a weighted distance function.

12. The system of claim 11, wherein the weighted distance function is an inverse distance weighted (IDW) function.

13. The system of claim 10, wherein the heat determination module executable by the processor is further arranged to calculate a trapezoid distribution between the first and second data point, where the length of the parallel surfaces of the trapezoid distribution at the data points is based on the value of the calculated flow emanating from each represented data point.

14. The system of claim 10, wherein the heat determination module executable by the processor is further arranged to calculate a triangular prism distribution between the first and second data point, where the height of the triangular prism at each data point is based on the value of the calculated flow emanating from each represented data point.

15. The system of claim 14, wherein the prism height corresponds to one or more of a range of colors or shadings.

16. The system of claim 10, wherein the conical data distribution values are calculated by applying one of a frustoconical distribution, an exact conical distribution or a skewed conical distribution to the data value.

17. The system of claim 16, wherein the inverse conical data distribution values are calculated by applying one of an inverse frustoconical distribution, an exact inverse conical distribution or a skewed inverse conical distribution to the data value.

18. The system of claim 10, wherein the inverse conical data distribution values are calculated by applying one of an inverse frustoconical distribution, an exact inverse conical distribution or a skewed inverse conical distribution to the data value.

19. A non-transitory computer readable storage medium storing one or more programs configured for execution by an electronic computing device, the one or more programs comprising instructions for:
positioning data points at respective data point locations on a heatmap for graphical representation;
calculating bi-directional flow values between data points, at least two data points having bi-directional flow values to at least two other data points;
determining the intensity and direction of a predominant flow from the bi-directional flow values;

calculating weighted heat values for an area on the heatmap based on the bi-directional flow values near the area, the distance the bi-directional flow values are from the area and flow start values for the data points;

for each data point, representing flow start values at each respective data point by calculating respective conical data distribution values around the respective data point based on the flow start value associated with the respective data point, wherein each conical distribution comprises a set of locations and a unique distribution value corresponding to each location in a respective region centered on the respective data point location;

for each data point, determining whether the calculated respective conical data distribution values of other data points at the respective data point location are greater than the flow start value associated with the respective data point; and upon a positive determination, calculating inverse conic data distribution values around the respective data point based on the flow start value associated with the respective data point; and graphically representing the predominant flow, the bi-directional flows between the data points, the calculated weighted heat values, the calculated conical data distribution values and the calculated inverse conic data distribution values in the heatmap.

20. The non-transitory computer readable storage medium of claim 19, wherein the conical data distribution values are calculated by applying one of a frustoconical distribution, an exact conical distribution or a skewed conical distribution to the data value and wherein the inverse conical data distribution values are calculated by applying one of an inverse frustoconical distribution, an exact inverse conical distribution or a skewed inverse conical distribution to the data value.

* * * * *